United States Patent [19]

Korte et al.

[11] Patent Number: 4,757,198

[45] Date of Patent: Jul. 12, 1988

[54] MASS ANALYZER SYSTEM FOR THE DIRECT DETERMINATION OF ORGANIC COMPOUNDS IN PPB AND HIGH PPT CONCENTRATIONS IN THE GAS PHASE

[75] Inventors: Friedhelm Korte; Ahmet H. Parlar, both of Attenkirchen, Fed. Rep. of Germany; Frederick Coulston, Alamogordo, N. Mex.

[73] Assignee: Coulston International Corporation, Albany, N.Y.

[21] Appl. No.: 910,371

[22] Filed: Sep. 22, 1986

Related U.S. Application Data

[63] Continuation-in-part of Ser. No. 840,496, Mar. 17, 1986.

[30] Foreign Application Priority Data

Mar. 22, 1985 [DE] Fed. Rep. of Germany ....... 3510378

[51] Int. Cl.[4] .............................................. B01D 59/44

[52] U.S. Cl. .................................... 250/288; 250/282; 250/289

[58] Field of Search ................ 250/281, 282, 288, 289

[56] References Cited

U.S. PATENT DOCUMENTS

| | | | |
|---|---|---|---|
| 2,610,300 | 9/1952 | Walton et al. | 250/288 |
| 2,714,164 | 7/1955 | Riggle et al. | 250/289 |
| 3,187,179 | 6/1965 | Craig et al. | 250/289 |
| 3,700,893 | 10/1972 | Seidenberg et al. | 250/289 |
| 4,442,353 | 4/1984 | Baubron | 250/288 |
| 4,672,203 | 6/1987 | Holkeboer | 250/289 |

*Primary Examiner*—Bruce C. Anderson
*Attorney, Agent, or Firm*—Leydig, Voit & Mayer

[57] ABSTRACT

A single-stage quadrupole mass analyzer is provided with a highly sensitive electron multiplier, a turbomolecular pump, and a mass correction lens placed between the quadrupole sensor unit and the turbomolecular pump. These components are arranged and selected to provide a substantial increase in sensitivity permitting the direct analysis of organic compounds in the gas phase in the ppb and high ppt concentration range. The placement of the mass correction lens and the area of its aperture has a pronounced effect on the detection limit, the optimum aperture area is a function of the mass of the molecules to be detected, and preferably an iris diaphragm is used to permit manual of automatic adjustment of the aperture area to a predetermined optimum for each of the different substances to be detected. Preferably the electron multiplier voltage is also variably selected and reset during the scanning of each fragment ion to optimize the signal-to-noise ratio of the electron mutiplier. The mass analyzer is sufficiently compact and economical to provide on-site analysis and the continuous monitoring or control of industrial processes.

20 Claims, 6 Drawing Sheets

MASS ANALYZER SYSTEM FOR THE DIRECT DETERMINATION OF ORGANIC COMPOUNDS IN PPB AND HIGH PPT CONCENTRATIONS IN THE GAS PHASE

RELATED APPLICATIONS

The present application is a continuation-in-part of U.S. application Ser. No. 840,496 filed Mar. 17, 1986.

BACKGROUND OF THE INVENTION

1. Field of the Invention

The invention relates generally to the field of mass analysis. The invention more specifically relates to a method and apparatus for gas-phase analysis of organic compounds at low concentrations in test samples.

2. Description of the Prior Art

As is generally well known, problems associated with mass analyzers limit the range of concentrations over which organic compounds can be detected and analyzed in the gas phase. Test samples usually must be concentrated in an enrichment step prior to analysis. Because complicated procedures for taking the sample and concentrating it cannot be standardized, considerable deviation and error in measurement occur. Considerable amounts of the test sample are lost by the use of gas sampling devices such as gas syringes for transfer of the concentrated sample to the analyzer. Additionally, gas phase reactions continue during transfer of the sample to the analyzer, further impairing the analysis. Very rarely is the detector satisfactorily combined with the sampling or reaction volume, and in such cases the systems are based on special spectroscopic methods.

Conventional mass analyzers cannot be used for the direct detection and measurement of organic compounds in ppb concentrations. The low signal-to-noise ratio at regular pressures of $10^{-4}$ to $10^{-6}$ torr prevents analysis in the ppb range. A straight increase in the vacuum reduces the concentration of the chemicals below the detection limit. These conventional mass analyzers include single-stage magnet sector units, and more recently introduced single-stage quadrupole units.

No practical device for directly analyzing chemicals in the gas phase in ppb concentrations was previously available which operated without a preliminary enrichment (concentration) step. For a mass analyzer using a single-stage magnet sector to obtain the required resolution and sensitivity, a very large magnet is required, resulting in a very massive machine. An alternative approach is to use two or more stages of magnet sectors or quadrupole units in which the first stage, in effect, provides a preliminary enrichment or concentration for the second step. Such multiple stage machines are more complicated and still tend to be physically large. Their relatively large size and high cost generally preclude their use for on-site sampling or the continuous monitoring of industrial processes.

BRIEF SUMMARY OF THE INVENTION

The primary object of the invention is to provide a method and apparatus for analyzing chemicals in the gas phase at ppb and high ppt concentrations without a preliminary concentration step.

A specific object of the invention is to provide a single-stage quadrupole mass analyzer with increased sensitivity capable of detection even at pressures of $10^{-9}$ torr.

Another object of the invention is to provide a quadrupole mass analyzer of increased sensitivity with a more efficient device for transferring samples to the detector of the analyzer.

Yet another object of the invention is to provide an economical and portable mass analyzer of increased sensitivity for on-site sampling and continuous monitoring of industrial processes.

Briefly, in accordance with a primary aspect of the invention, the method comprises transferring organic substances from a storage vessel or reservoir at high pressure through a metering device into a quadrupole mass analyzer at low pressure, decreasing the concentration of the substances by evacuating the mass analyzer to pressures below usual operating conditions, and detecting the substances with a quadrupole mass analyzer of increased sensitivity.

A quadrupole mass analyzer is provided with a needle valve to permit the introduction of the sample into the vacuum chamber of the analyzer, an ion pump for obtaining a reduced pressure in the vacuum chamber, and a secondary electron multiplier for providing increased sensitivity.

Preferably the test sample passes directly through a separator system of needle valves from a vacuum controllable sampling manifold to a modified quadrupole mass analyzer, the secondary electron multiplier is a Channeltron ® electron multiplier, and a turbomolecular pump used during mass analysis is combined with a mass correction lens. These modifications to the system reduced background noise such that organic compounds could be detected and concentration determined in the range of from ppb to high ppt in the gas phase using direct mass spectroscopical analysis without preliminary enrichment procedures.

It has been found that the location and orientation of the gas inlet and outlet to the quadrupole mass sensing unit, and specifically the placement and aperture of the mass correction lens, have a critical effect on the detection limit. Although the precise mechanism for the improvement of the detection limit is not clearly understood at this time, it appears to be related to an ongoing cleansing of the quadrupole sensing unit during analysis which preferentially increases the duration which the molecules to be detected remain in the quadrupole sensing unit and thereby increases their concentration in the sensing unit relative to the population of the background molecules. This hypothesis is supported by the discovery that there are respective optimum areas of the aperture of the mass correction lens for various substances to be detected.

In any event, the improved performance is surprising in view of the fact that at low pressures the mean free path of the molecules is much greater than the physical dimensions of the quadrupole sensing unit, and normal non-linearties were previously observed at pressures above $1\times10^{-5}$ Torr. These normal non-linearities were attributed to the molecular collisional effects and were previously minimized by operating the ionizer of the quadrupole unit at reduced electron emission current settings.

The effect of the aperture area of the mass correction lens and the variation of the optimum area for various substances are so striking that, in accordance with an important aspect of the present invention, the mass correction lens is provided with means for variably selecting the area of the aperture for the specific substance to be detected. If the concentrations of a number of substances of varying molecular weights are to be determined, the aperture area is preferably reset a number of times during the mass scanning process to use respective optimum values when scanning the fragment ions for the different substances.

During operation of the mass analyzer with the mass correction lens having an optimum aperture area, it was found that the noise level or baseline of the Channeltron® electron multiplier deviated from its optimum minimum level as a function of the mass of the ions to be detected. In accordance with another aspect of the present invention, the operating characteristics of the Channeltron® are readjusted for the detection of ions of different mass. In particular, the value of the high voltage supplied to the Channeltron® for effecting electron multiplication is variably selected as a function of ion mass. This variable selection of the voltage supplied to the Channeltron® preferably is coordinated with automatic selection of the altenuator gain in the electrometer responsive to the direct Channeltron® output, so that the dynamic range of sensing the ion current of the selected mass is not exceeded. Associated with prestored Channeltron® voltage control settings are corresponding gain factors, and therefore the actual ion current is readily computed from the digitized electrometer output value, the prestored gain factor having been set for the mass being analyzed, and the electrometer altenuator gain having been automatically reset, if necessary, to avoid limiting of the electrometer output in the event of a high ion concentration at the mass selected for analysis.

Accordingly, this invention is useful for a variety of applications requiring the measurement of ppb and high ppt concentrations of chemicals. The invention was used for the determination of work place concentrations of chemicals in production units (e.g. benzene and 1,2-transdichloroethylene, detection limit: 100–500 ppt), indoor concentration of chemicals of homes, offices etc. (pentachloro phenol, detection limit: 40–55 $\mu g/m^3$), analysis of water and soil samples (benzene from water, detection limit: 10 ppb, $CO_2$ from sand, detection limit: 100 ppt), determination of the photostability of organic compounds, determination of toxic compounds in inhalation chambers (acetylacetone, benzene, tetrachloromethane, freons 11 and 12, benzaldehyde, chlorobenzene, 1,2 transdichloroethylene, detection limit: 100–500 ppt). Also the invention can be used for the determination of blood alcohol, of volatile compounds in urine, of chlorinated hydrocarbons in fat tissues, of volatile products in sewage sludge, in slag of waste incineration, and in fly ash, for the monitoring of atmospheric concentrations of chemicals (pollutants such as $NO_x$, $SO_2$, and organic environmental chemicals), of exhaust fumes of internal combustion machines, for the indentification and quantification of industrial gas phase reactions (e.g. $NH_3$ synthesis), of thermal degradability of raw materials used in the semiconductor industry, for the determination of gases such as hydrogen, helium, nitrogen and other gases in industry and for the monitoring of thermal decompositions of chemicals during combustion and pyrolysis.

BRIEF DESCRIPTION OF THE DRAWINGS

Other objects and advantages of the invention will become apparent upon reading the following detailed description and upon reference to the drawings in which.

Figure 1:
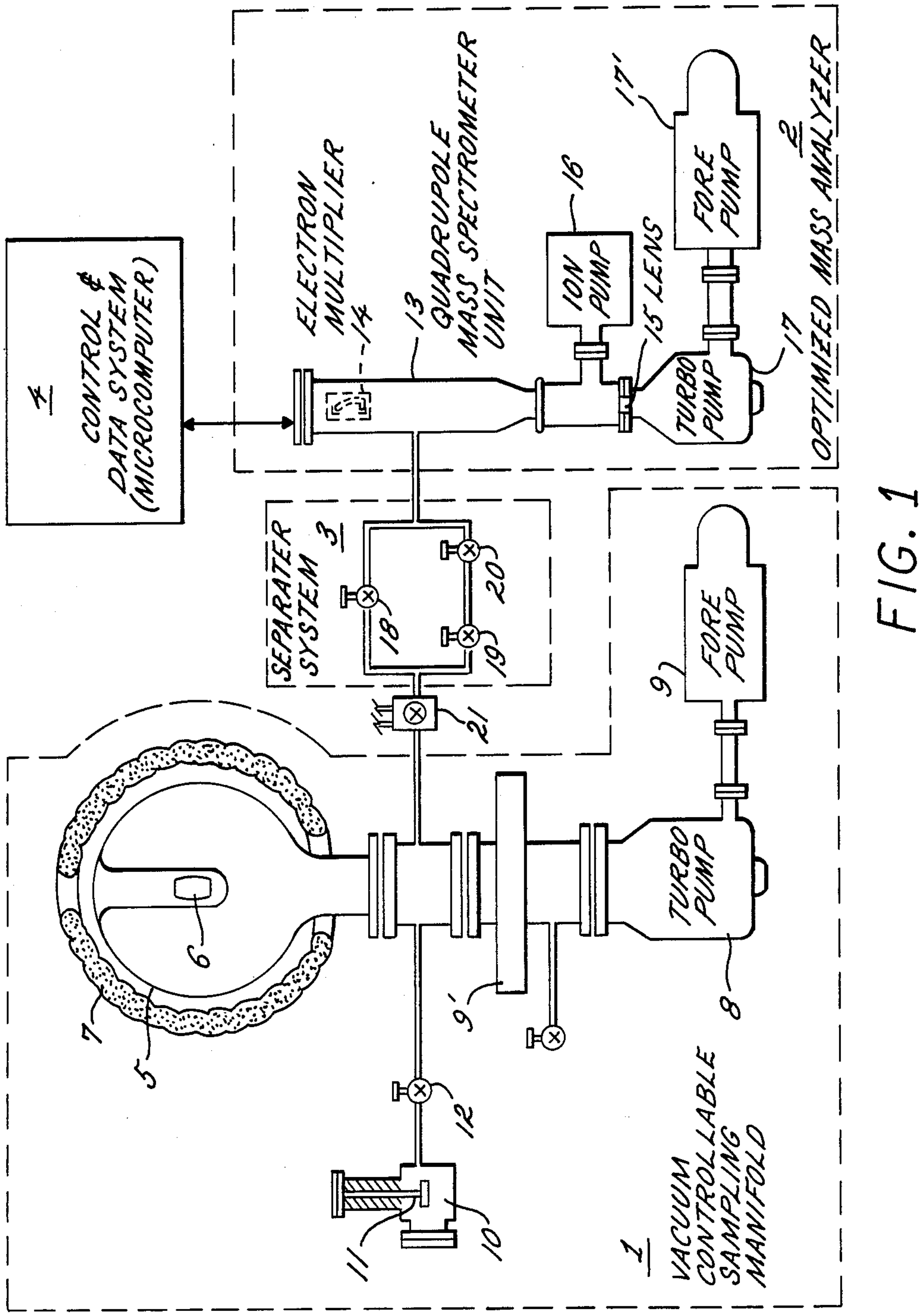
FIG. 1 is a schematic drawing of an apparatus according to a preferred embodiment of the invention including a vacuum controllable sampling manifold, and also showing an optimized mass analyzer, a special separator system, and a control and data system.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents and alternatives falling within the spirit and scope of the invention as defined by the appended claims.

DETAILED DESCRIPTION OF THE PREFERRED EMBODIMENT

Figure 2:
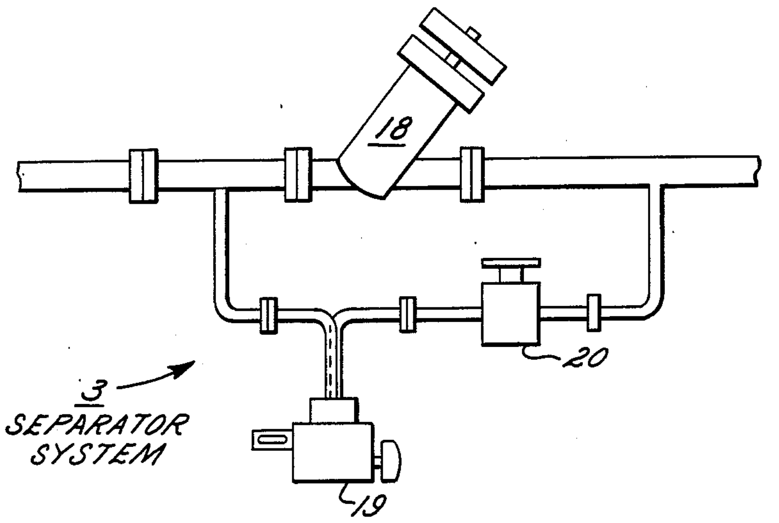
FIG. 2 is a detailed drawing of the special separator system.

Turning now to FIGS. 1 and 2, there is shown a gas-phase mass analyzer system including a vacuum controllable sampling manifold 1 for obtaining a test sample in gaseous form, an optimized mass analyzer 2 for detecting minute concentrations of molecules, a special separator system 3 for controlled transfer of gas from the sampling manifold 1 to the mass analyzer 2, and a control and data system 4, all of which are further described below.

The sampling manifold 1 consists of a spherical reactor 5 with varying volumes of 1–400 liters (0.3–110 gl.) and may include accessory devices for specific purposes such as a lamp 6 for irradiation. The reactor 5 is equipped with a heating mantle 7 allowing temperatures of up to 200° C. (400° F.). The entire system 1 is evacuated by means of a turbomolecular pump 8 (e.g. Galileo model PT-60) to a pressure of $10^{-8}$ torr. The exhaust of the turbomolecular pump 8 is removed by a fore pump 9 (e.g. Edwards model E2 M8). The reactor 5 can be separated from the pump system 8, 9 by a sliding valve 9' with viton seals.

In a typical mode of operation, solid or liquid samples are introduced into an inlet system 10. After achieving the desired pressure in the inlet system 10, the samples or portions thereof become vaporized. The concentrations in the gas phase can be determined by measuring the pressure. The inlet system 10 consists of a stainless steel casing with vacuum-tight sealable openings. A spring-loaded metal rod 11 serves to liberate mechanically volatile samples kept in standardizable glass capillaries. Porcelain boats are available for the introduction of solid samples. Placed underneath the inlet system 10, a commercially available combination of variable gas valves 12 (e.g. CJT-Vacuum-Technik, Ramelsbach) controls the flow of material into the reactor 5. The sampling manifold 1 may be used at pressures within the range of of $1–10^{-8}$ torr and also works with variable volumes of gas mixtures at variable pressures.

The optimized mass analyzer system 2 consists of a quadrupole mass spectrometer unit 13 (UTI model 100c-02) including a Channeltron® electron multiplier 14. The quadrupole mass spectrometer unit 13 is further described in the "UTI100C Precision Mass Analyzer Operating and Service Manual", Uthe Technology International, 325 North Mathilda Avenue, Sunnyvale, California 94086 (1979), which is incorporated by reference herein. The UTI100C unit 13 is sold along with a control unit (76 in FIG. 8) which enables manual operation and provides an interface for direct connection to a standard microcomputer 4 which provides the control and data system. Without the modifications described below, the UTI100C was found to have a detection limit for nitrogen of $10^{-14}$ torr or 0.1 ppm.

In accordance with an important aspect of the invention, the quadrupole unit 13 was further optimized by installing an ion pump 16 (e.g. Varian Vaciono 8 l/s) at a right angle, a mass analyzer-turbomolecular pump 17, and a mass correction lens 15 installed at the inlet of the turbomolecular pump. The mass correction lens is a copper disc having an outer diameter of 48 mm, a thickness of 2 mm, and an aperture of from about 20 mm to 45 mm which should be selected for the particular substance to be detected, as further described below. The exhaust of the turbomolecular pump 17 is eliminated by an associated fore pump 17'.

The optimal functioning of the modified system was evaluated according to the following criteria:

(a) Tightness of the entire system was determined by means of the time dependent increase of pressure allowing a maximum leak rate of $1\times10^{-5}$ torr l/s; and (b) Sensitivity measurements of the quadrupole spectrometer 13 were made using benzene, acetylacetone and chloroform, achieving a detection limit of at least 100 ppb.

By these improvements, the operating pressure of the mass analyzer was reduced to $10^{-9}$ torr, so that the background noise could not be measured any longer. Since the sensitivity increased enormously, the detection and determination of ppb and ppt concentrations of chemicals was made possible. Since the background could not be measured, spectras from pure samples were obtained.

The separator system 3 is placed between manifold 1 and mass analyzer system 2, and an optional selector valve 21 may be placed between the separator system 3 and the sampling manifold 1 to obtain gas phase samples from locations (not shown) other than the sampling manifold 1. The separator system 3, further shown in FIG. 2, consists of three needle valves 18–20 which can be combined in parallel or in series. Usually valve 18 is closed, i.e., the pressure in the manifold is higher than $10^{-6}$ torr and the concentrations of the chemicals to be examined are high. Valves 19 and 20 control the flow into the mass analyzer 2 in such a way that the necessary levels for both pressure and concentration of the materials in the mass spectrometer are achieved. In case these operating parameters exist already in the manifold 1, the manifold 1 and mass analyzer system 2 can be connected directly via valve 18.

A control and data system 4 (FIG. 1) uses a "Texas Instruments Portable Professional" microcomputer for interpretation and storage of information about the state of the system. The microcomputer includes a TMS 9995 microprocessor board (16-bit microprocessor with 8-bit data bus, 73 commands, 3.0 MHz system frequency, floppy disc control RS 232c, 64 K byte storage, double Euroboard format), an RS 232 input board (single Euroboard format), an input board (16 bit, single Euroboard format), an output board (16 bit, single Euroboard format), a color video board (high resolution $512\times512$, single Euroboard format), a first D/A converter board (12 bit resolution, single Euroboard format), a second D/A converter board (16 bit resolution, single Euroboard format), an E-Bus back wall board (single Euroboard format), a power supply (+5, +−15 V with overwattage protection and current limiter), a high-resolution color monitor, a system chassis, a VT-100 compatible keyboard, a dual-Floppy-Disk-DSDD, an interface cable for the UTI-100c-02 quadrupole spectrometer 13, and a housing for the processor and monitor.

The microcomputer was programmed to perform remote control of the UTI-100C-02 quadrupole spectrometer scanning and collection of the spectrometer data. The computer program is listed in the Appendix to the present specification.

The microcomputer 4 transmits a precise voltage to the spectrometer 13 to select the mass of the ions which are detected by the electron multiplier 14. This precise voltage is generated by a 16 bit digital-to-analog converter having a 0–10 V range, a dynamic impedance less than 1 kOhm, noise level less than 1 mV, and drift less than 0.0005%, to insure a spectrometer resolution of 0.01 AMU. The microcomputer also has an output for selecting whether the electron multiplier is reading a multiplied ion concentration signal or a non-multiplied Faraday cup signal received for determining the multiplier gain by comparison of the two signals, and an output activating an analog switch for feeding either the signal from the electron multiplier or the signal from a pressure gauge to a twelve bit analog-to-digital converter for input to the microcomputer. In this fashion the microcomputer can read the electron multiplier for ion current within the picoammeter range from $10^{-5}$ to $10^{-12}$ amperes, and the total pressure from $10^{-3}$ to $10^{-8}$ torr. The ionizer filaments in the mass spectrometer are automatically shut down in the event of extreme conditions such as loss of vacuum indicated by the electron multiplier signal or the pressure gauge signal.

The microcomputer can therefore control the mass spectrometer to scan any desired range or discrete points of the mass spectrum. The microcomputer has also been programmed to present the spectrometer data according to several standard formats. Scans are performed prior to analysis to characterize background noise as a function of total pressure and this pre-determined background noise level is subtracted from the molecule or fragment ion concentration taking into account continuous total pressure monitoring during analysis. The total pressure is continuously displayed on the monitor. The molecule concentrations are also normalized taking into account the total pressure in order to display normalized line spectra on the monitor or to output the mass spectra to a printer as listings or (graphic) matrix reproduction. The intensity of freely selectable peaks can be monitored as a function of time. The peak intensity can be transmitted in serial RS 232 format to a remote location. The microcomputer can perform specific peak-mode monitoring of a maximum of eight selected AMU peaks as a function of time. The spectra can be automatically calibrated for $m/c^+$ and their intensities. Quantitation is performed using both second-order approximation and suitable calibration substances (e.g. Freons, carbon tetrachloride, benzene, toluene). Moreover, specified standard spectra can be stored using five selected fragment ions.

The following suggested applications illustrate the various fields of application for our mass analyzer system, but they are in no way intended to limit the uses or fields to which this invention is capable of being applied:

1. Determination of work place concentrations of organic chemicals in production units By means of our mass analyzer system, the concentrations of chemicals in factories and production units can be determined and controlled continuously. The optimized analyzer system 2 with the separator system 3 is able to measure directly air samples taken at ambient pressure. By using the separator 3 with the optional selector valve 21 (FIG. 1), samples from different locations can be taken. Since one spectrum only takes 10 seconds, the time dependent work place concentration at different locations can easily be determined and monitored. Also, acute maximum concentrations, which are extremely important for the evaluation of work place safety, can be measured. Chemical concentrations of benzene and 1,2-transdichloroethylene, for example, can be detected to 100–500 ppt.

2. Determination of indoor concentrations of chemicals

Since the sensitivity of the described gas phase mass analyzer reaches the low ppb to high ppt level, the concentrations of pollutants in indoor areas, e.g. homes or offices, can easily be measured. Concentration/time diagrams allow the elucidation of the actual indoor exposure to pollutants. Pentachlorophenol, for example, can be detected down to 40–55 $\mu g/m^3$.

3. Analysis of aqueous and solid samples (studies of water and soil samples)

After placing aqueous or solid samples into the inlet system 10, the volatile compounds are transferred into the gas phase by the high vacuum and analyzed in the way described above. $CO_2$ from sand, for example, has been detected by means of our invention at 10 ppb, and the detection limit is about 100 ppt.

4. Determination of the photostability of organic compounds

The material to be examined is placed on a suitable carrier (e.g. on a cold finger by dissolving the material, applying on the cold finger, and evaporating the solvent or placing the material directly on the cold finger, e.g. plastic foils) and irradiated by external light sources 6 with variable wave lengths. The volatile photoproducts are determined by the mass analyzer system, the concentrations are determined by measuring the pressure.

5. Monitoring of inhalation experiments

Our analyzer can be used particularly well for the monitoring of toxicological inhalation studies, since both the administered chemicals and the substances exhaled by the animal can be measured over any desired period of time. Acetylacetone, benzene, tetrachloromethane, freons 11 and 12, benzaldehyde, chlorobenzene, and 1,2-transdichloroethylene, for example, can be detected down to 100 to 500 ppt.

Figure 3:
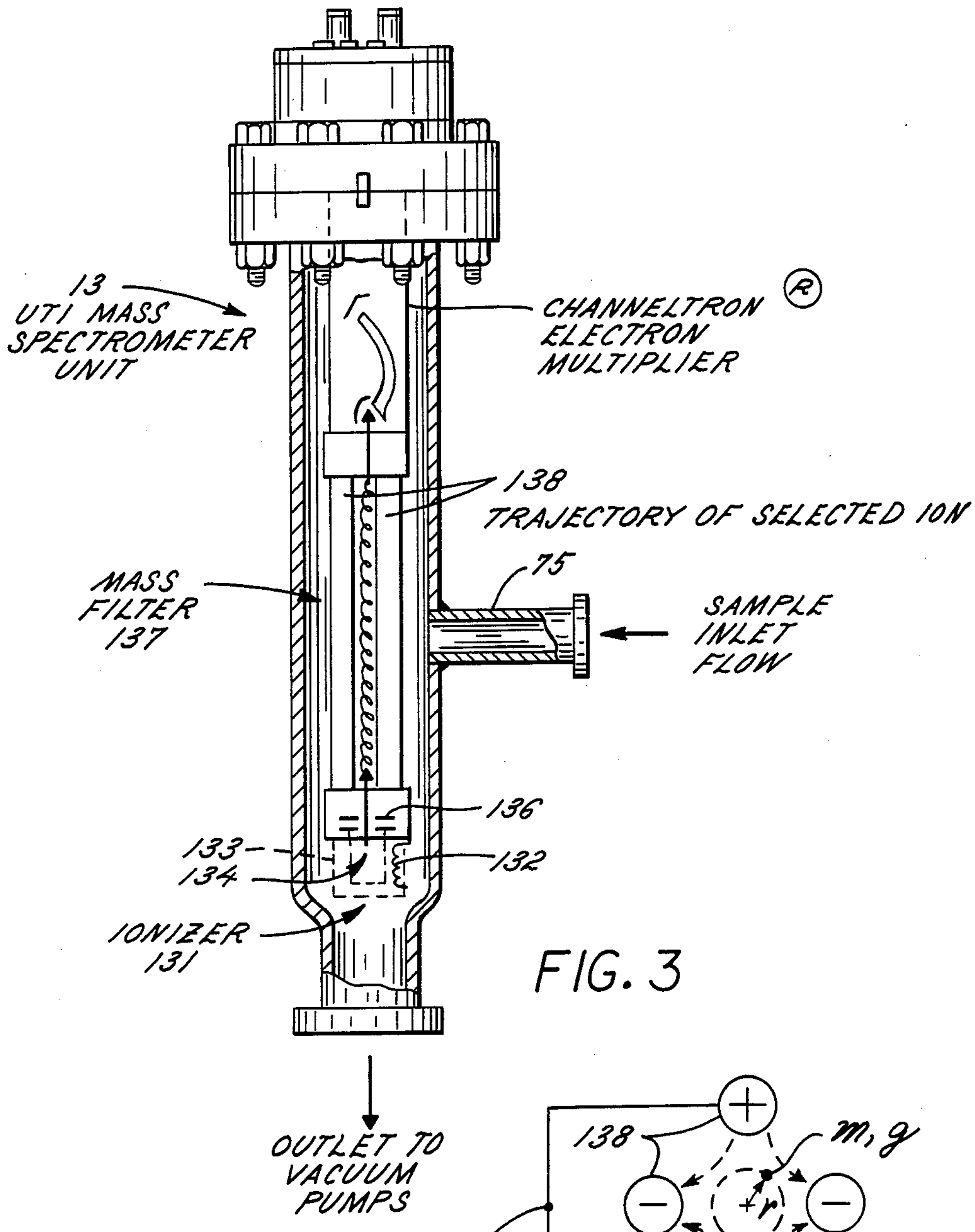
FIG. 3 is a schematic drawing of the internal construction of the quadrupole mass spectrometer unit including the electron multiplier.

Turning now to FIG. 3, there is shown a schematic drawing of the internal components of the UTI100C mass spectrometer unit 13. At the bottom is an ionizer 131 in which a thoriated irridium thermionic filament 132 emits electrons which are attracted to a cylindrical grid 133, pass through it, and form a negative space charge region 134 within the grid 133. Some of the electrons strike molecules in the gas sample, causing them to ionize, and the ions are attracted to the negative space charge region 134. The grid 134 is itself positive, causing ions to be emitted through a central aperture in a focus plate 136 and travel upward to the Channeltron® electron multiplier 14.

Figure 4:
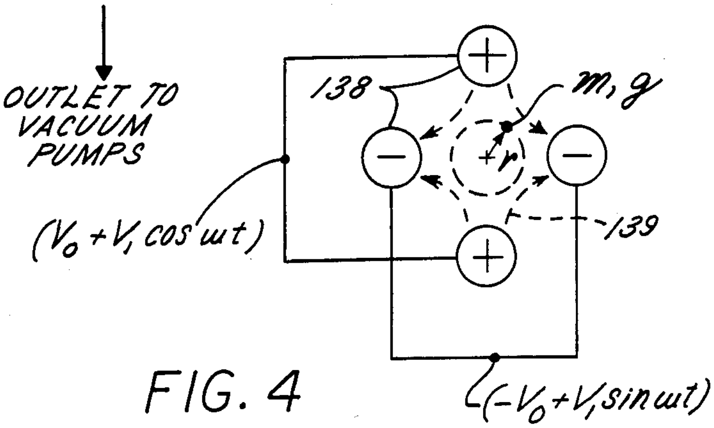
FIG. 4 is a schematic diagram of the mass filter in the quadrupole unit of FIG. 3.

In order that ions of only a selected mass reach the Channeltron® 14, a mass filter generally designated 137 is interposed between the ionizer 131 and the Channeltron® 14. The mass filter 137 includes four precisely machined rods 138, two of which are charged positive ($+V_o$), and the other of which are charged negative ($-V_o$), setting up a quadrupole electric field 139, as shown in FIG. 4. This quadrupole electric field 139 has a value of zero on axis, and increases from zero as a function of the distance from the axis, tending to cause the ions to move away from the positive rods and toward the negative rods. But ions of a selected mass, or more precisely a selected mass to charge ratio, are diverted by an additional alternating potential ($V_1\cos\omega t$, $V_1\sin\omega t$) between the positive and negative rods, causing the selected ions to travel about the axis in a circular orbit, and thereby permitting them to travel to the Channeltron® where they are detected as an ion current.

A simplified model of the operation of the mass filter assumes that the resonance condition of the selected ions results from a centripetal acceleration which is known from Newton's law to be related to the electrostatic force according to:

$$mr\omega^2 = q\,E_r$$

where m--, is the mass of the selected ion, r is the radius of the centripetal motion about the central axis of the mass filter, $\omega$ is the angular frequency of the alternating potential ($V_1\cos\omega t$, $V_1\sin\omega t$), q is the charge of the ion, and $E_r$ is the maximum radial component of the alternating electric field at the radius r. The maximum radial component $E_r$, however, is approximately a linear function of r, according to:

$$E_r = r\frac{V}{a^2}$$

where a is a constant distance on the order of the radius of the rods 138 from the central axis and which is related to the diameter and spacing of the rods. By eliminating $E_r$ from the two equations above, it is seen that the resonance condition becomes independent of r, and the selected mass to charge ratio can be varied by adjusting V or ω:

$$\frac{m}{q} = \frac{V}{\omega^2 a^2}$$

In practice it is most convenient to adjust V while holding ω constant, to obtain a mass spectrum.

This simplified theory of operation does not take into account the effects of collisions between ions or ions and molecules which might occur in the mass spectrometer unit 13 and tend to disturb the highly selective resonance condition. Although the low pressures in the unit during mass analysis insures that intermolecular collisions are infrequent, they are manifested by the so-called normal non-linearities which appear at pressures greater than about $1\times10^{-5}$ torr These effects have previously been minimized by operating the thermionic filament 132 (FIG. 3) at reduced emission currents. Apparently this reduces the normal non-linearties by reducing the ionization rate in the ionizer, so that nonlinear effects caused by ion-ion interactions (such as inter-ion collisions or the build-up of an ion space charge in the mass filter 137) are reduced.

Experimentation with the UTI100C, however, revealed that the placement and orientation of the inlet and pumps had a critical effect on the mass spectrometer's detection limit. Apparently these factors affect the detection limit by preferentially affecting the flow of the background constituents (e.g., $N_2$ in an air sample) relative to the ions to be detected, and also tend to shield the highly sensitive Channeltron ® from interference, which would otherwise be caused by the flow of the sample toward rather than away from the Channeltron ® if the vacuum pumping system is kept on during sensing to preferentially deplete the background concentration.

In any event, it has been found that the detection limit can be greatly increased by introducing the sample from a central side port 75 (FIG. 3) in the UTI100C mass spectrometer unit 13, and evacuating the unit from its ionizer end with a turbomolecular pump during mass analysis. Also, the ion pump (16 in FIG. 1) should be used to reduce the partial pressure of the light molecules in the mass spectrometer unit 13 prior to the introduction of the sample, although it cannot be used during the subsequent mass analysis of the sample since its power supply generates electrical interference with the electrical signal from the Channeltron ® 14. Moreover, it is very advantageous to use the mass correction lens (15 in FIG. 1) at the inlet to the turbomolecular pump 17, and to select the area of the aperture in the lens in accordance with the mass of the molecules to be detected.

Figure 5:
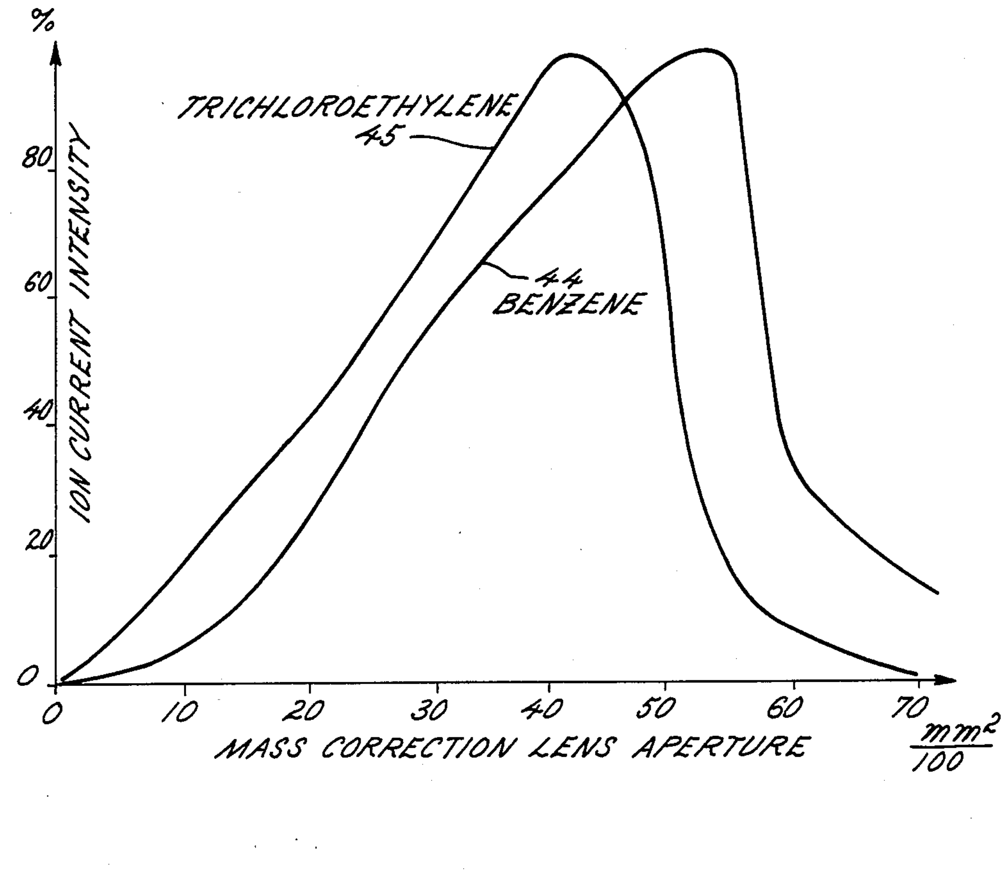
FIG. 5 shows respective graphs of the relative ion current intensities for benzene and trichloroethylene as a function of the area of the aperture in the mass correction lens.

Turning now to FIG. 5, the criticality of the area of the aperture of the mass correction lens is illustrated along with the dependance of the optimum aperture area as a function of mass of the molecules to be detected. The relative intensity of the detected ions as a percentage of the maximum intensity is plotted as a function of the relative aperture area, in terms of the percentage of the maximum aperture area for a full opening having a 45 mm internal diameter. The optimum aperture area for benzene is about 54% of the area of a full opening (i.e., an internal diameter of 33 mm). The optimum aperture area for trichloroethylene, however, is about 42% of the area of a full opening (i.e., an internal diameter of about 29 mm). In each case the pressure during mass analysis was $2.2\times10^{-6}$ torr In view of FIG. 5, it is advantageous to provide means for automatically selecting the aperture area during mass analysis to optimum areas for each compound to be detected. For this purpose a photographic iris diaphram was installed in lieu of the 2 mm thick copper disc mass correction lens (15 in FIG. 1). Therefore, the curves as shown in FIG. 2 can be obtained by continuously varying the area of the aperture and noting the change in the ion current for a characteristic ion of a standard sample of the compound to be detected. Preferably these tests are run for a number of different compounds, and the optimum values are prestored in the memory of the microcomputer 4. Then, during analysis of a sample, they are recalled from memory for readjusting the aperture area before the scanning of each of the respective fragment ion masses of interest.

Figure 6:
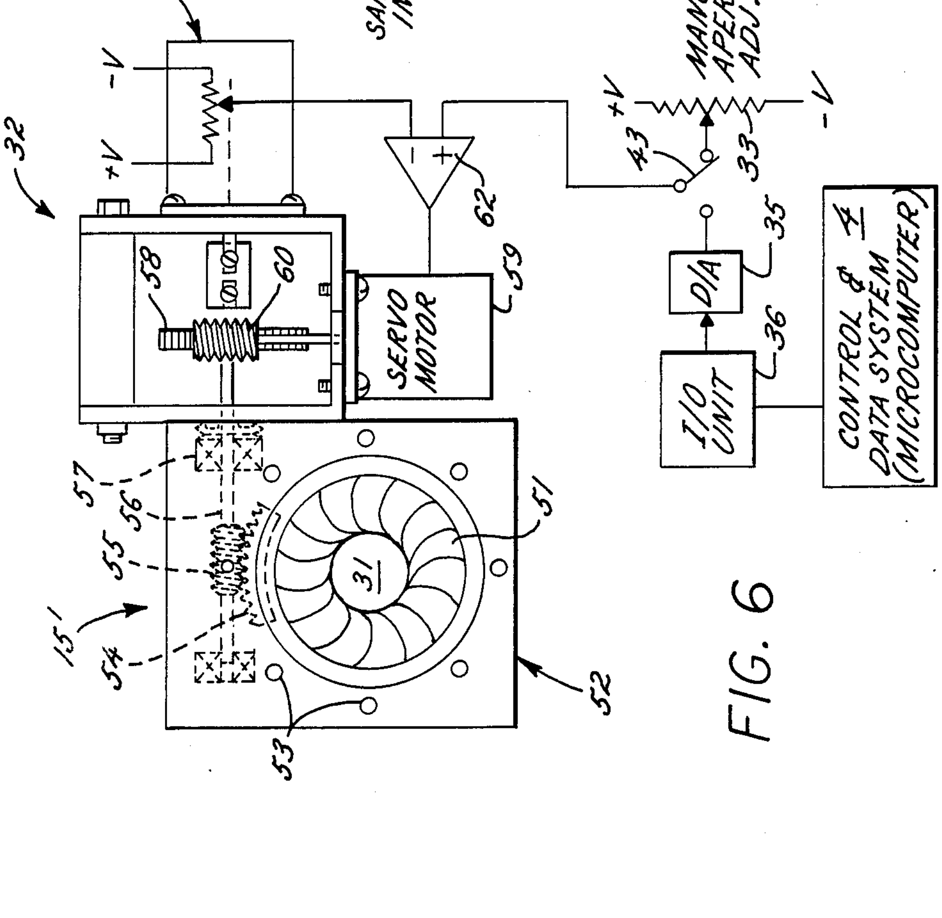
FIG. 6 is a schematic drawing of a control mechanism for automatic adjustment of the aperture of the mass correction lens.

Preferably the system is provided with automatic means for adjusting the aperture area of the mass correction lens. A proposed device is shown in FIG. 6. The iris diaphram 51 is mounted inside a two-part vacuum housing 52 which is provided with studs 53 or holes for attachment of the housing to the standard flanged vacuum connections (e.g., see FIG. 8). A ring gear 54 mounted to the iris diaphram 51 is adjusted by a worm gear 55 attached to a control shaft 56 protruding from the housing 52 through a vacuum seal 57. A second ring gear 58 is attached to the control shaft 56 and is selectively rotated by a servomotor 59 via a worm gear 60 for adjustment of the iris opening. The shaft of a multiturn potentiometer 61 is coupled to the control shaft 56 in order to sense the degree of opening of the iris diaphram 51.

Ring gear 58, servomotor 59, worm gear 60, multiturn potentiometer 61, and servo error amplifier 62 are generally designated as regulator 32.

In order to provide automatic as well as manual adjustment of the iris aperture, the servomotor is driven by a servo error amplifier 62 responsive to a command signal on a line 63. The command signal is provided either by a manually set potentiometer 64, or by a digital-to-analog converter 35 driven by an output interface 36 coupled to the microcomputer 4, as selected by a switch 43.

Figure 7:
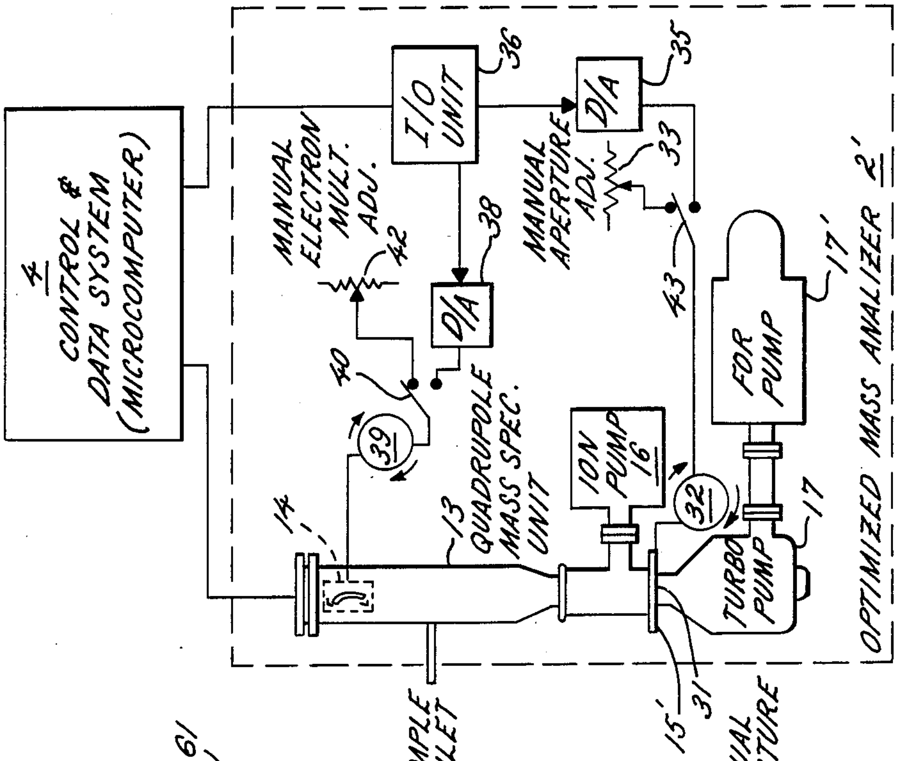
FIG. 7 is a schematic drawing of the optimized mass analyzer of FIG. 1 after the installation of the automatic control mechanism of FIG. 6 and an automatic control for variably selecting the operating voltage of the electron multiplier.

The optimized analyzer 2' with the automatic aperture adjusting mechanism installed is shown in FIG. 7. When the aperture 31 of the adjustable mass correction lens 15' is preset to a new area for a new substance as commanded by the computer 4, it is also desirable to automatically adjust the multiplier voltage of the Channeltron ® electron multiplier 14 to preselected values which optimize the signal-to-noise ratio of the detection process for the ions corresponding to the substance. For this purpose regulator 39 of the Channeltron ® power supply is controlled in response to a central signal. A switch 40 is provided to obtain the control signal from either another digital-to-analog converter 38 driven by the output interface 36, or from a manually adjustable potentiometer 42.

Figure 8:
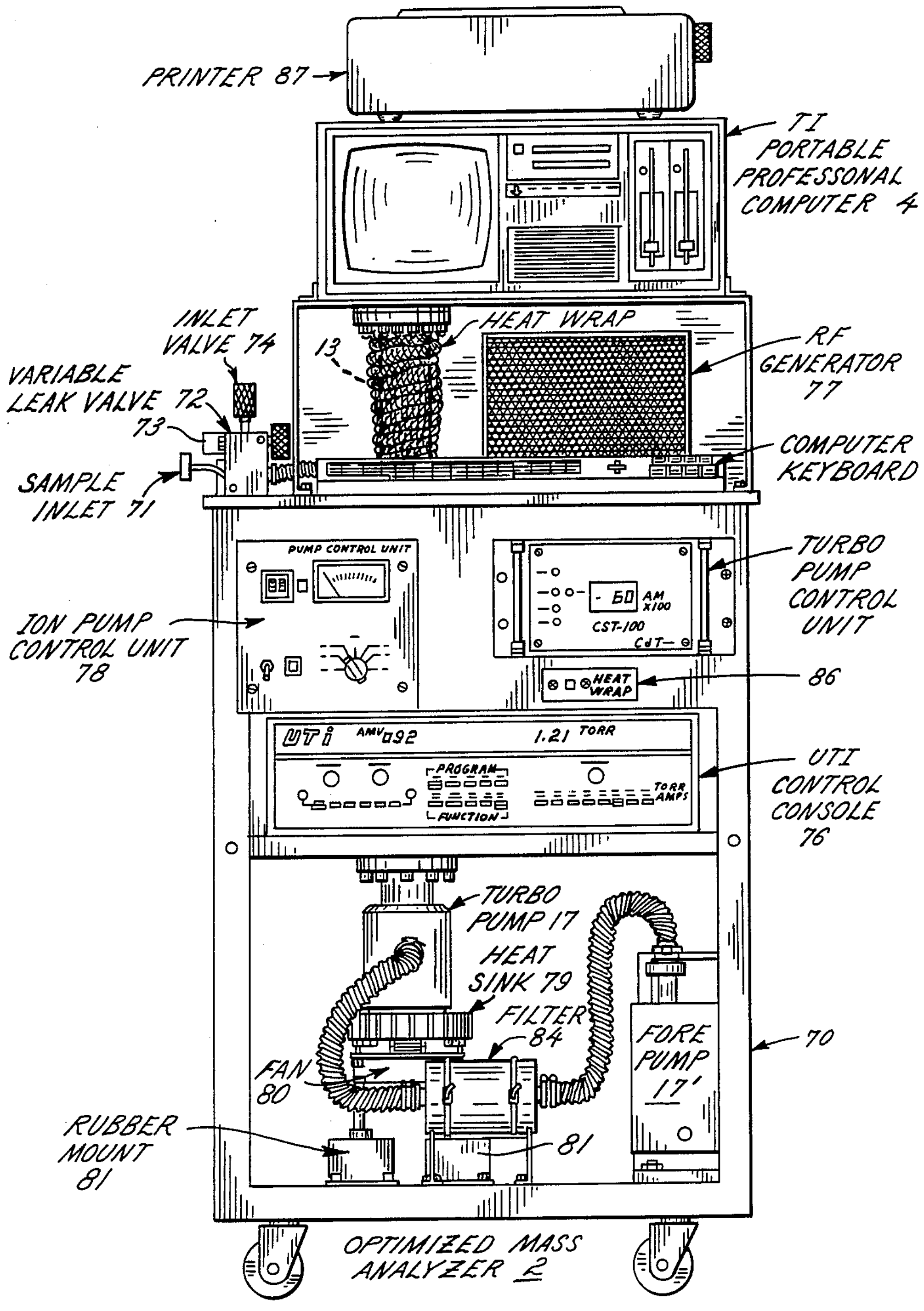
FIG. 8 is a front elevation view of the optimized mass analyzer and microcomputer of FIG. 1 mounted on a cart to provide on-site sampling.
Figure 9:
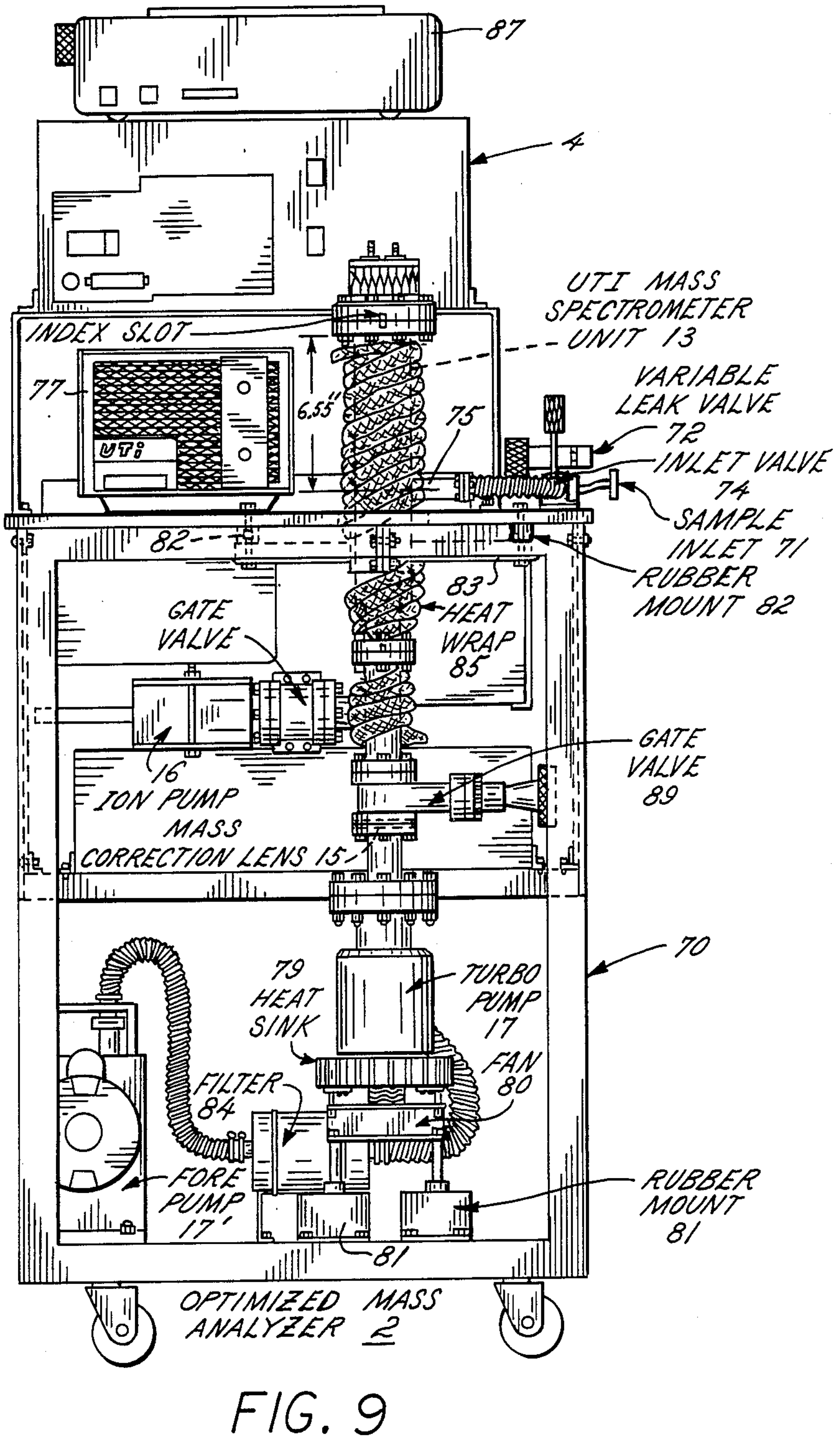
FIG. 9 is a rear elevation view of the system of FIG. 1 drawn to scale to illustrate the arrangement of the quadrupole sensor unit with respect to the sample inlet, ion pump, mass correction lens, and turbomolecular pump.

Turning now to FIGS. 8 and 9, there is shown a scale drawing of a mobile version of the optimized mass analyzer 2 of FIG. 1 mounted on a cart 70 having a frame of which is 32" high, 24" wide, and 32" deep. Instead of the sampling valves of FIG. 2, there is provided a flanged sample inlet 71, and a variable leak valve 72

(Series 203 by Granville-Phillips Co. of Boulder, Colorado) having a digital readout 73 indicating a multitude of possible settings. To quickly shut off the inlet flow, an inlet valve 74 is placed in series between the variable leak valve 72 and an inlet pipe 75 attached to the UTI100C mass spectrometer unit 13. (See the back side in FIG. 9).

The controls for the system 2 are shown in FIG. 8 on the front of the cart. The mass spectrometer unit 13 is controlled by a UTI control console 76, which indicates the ion mass being scanned in AMU and the vacuum in the spectrometer unit in torr. (The vacuum is sensed from the electrical conditions in the ionizer 131 in FIG. 3). The alternating voltage for the mass filter (137 in FIG. 3) is provided by an RF generator 77 by the Uthe Co., but it does not have any operator-adjusted controls. The control console 76 also provides the power supplied to the Channeltron ®, which was supplied by the Uthe Co. The ion pump 16 is powered by an ion pump control unit 78. The ion pump is a Varion No. BL/S No. 911-505 with a magnet No. 911-0030, from Varion Co., 700 Stuttgart 8, Handwerk str. 5-7, West Germany. The ion pump control unit is part No. 929-0062 supplied by Varion.

The turbomolecular pump 17 is an Electronana model ETP63180 controlled by a control unit 90 model No. CST-100 distributed by Vacuum Technik GMBH, 8061 Ramelbach, Asbacherstr. 6, West Germany. The turbomolecular pump 17 is run continuously at 6,000 RPM and is cooled by a heat sink 79 and a fan 80.

To prevent backflow of lubricating oil mist, an in-line filter 84 (Model No. TX075 by MDC Vacuum Products Corp., 23842 Cabot Blvd., Haward, Calif. 94545) connects the turbomolecular pump 17 to its associated fore pump 17'. The fore pump 17' is part No. ZM2004 supplied by Alcatel Co., 7 Ponds St., Hanover, Mass. 02339.

To reduce vibration to the mass spectrometer unit 13, the turbomolecular pump 17 is mounted to the cart 70 via rubber mounts 81, type SLM-1 supplied by Barry Controls GmbH, D6096 Raunheim, West Germany. The mass spectrometer unit is also more directly mounted to the top of the cart via rubber mounts 82 and a beam 83 which is clamped to the outer shell of the mass spectrometer unit 13.

In order to initially put the optimized mass analyzer in a high vacuum state, the fore pump 17' is turned on to pump the system down to a low vacuum. Then the turbomolecular pump is turned on until a higher vacuum is obtained. The system is then "baked out" by turning on a "heat wrap" resistance heater 85 which is energized by a triac power control 86 to bring the mass spectrometer unit 13 up to between 200° C. to 320° C. The "heat wrap" 85 and triac control 86 are supplied by CJT Vacuum, 8061 Ramelbach, Asbacherstr 6, West Germany. After the system is sufficiently baked out to obtain a high vacuum (e.g., better than $10^{-8}$ torr), the ion pump 16 is turned on to obtain an ultra-high vacuum (e.g., better than $10^{-9}$ torr.

Prior to analysis, power to the heat wrap 85 is turned off and the spectrometer unit is allowed to cool for about one to two and a half hours (depending on the bake-out temperature) to a final temperature of 150° C. or lower. For analysis, the ion pump 16 is turned off and then the mass spectrometer 13 is switched on from the UTI control console 76, thereby energizing the RF generator 77, the ionizer filament (132 in FIG. 3), and the high voltage supply to the Channeltron ® electron multiplier 14. The computer 4, and its associated printer 87, may be turned on at this time for automatic rather than manual control of the mass spectrum scanning.

For analysis of a sample from a source, the source is connected to the sample inlet 71. After checking the numeric indicator 73 to ensure that the variable leak valve 72 is closed, the inlet valve 74 is opened. Then, the variable leak valve is slowly opened until a pressure of $10^{-6}$ to $10^{-7}$ torr is indicated on the control console 76.

At this time a constant stream of the substances to be analyzed is passing through the mass spectrometer 13 to the turbomolecular pump 17, and the mass analysis process may begin for scanning a range of mass values, or if scanning for determining the concentration of known substances, the discrete mass values of the characteristic fragment ions of each substance. Although a mass correction lens 15 having a fixed aperture area is shown in FIG. 9, if the variable aperture lens 15' of FIG. 6 were used, the aperture of the lens would preferably be readjusted to an optimum area for each known substance. The total intensity of each known substance to be determined is then obtained by a weighted average of the measured currents of its fragment ions, the weighing factors being determined by the relative intensities of the fragments obtained during analysis of a standard sample of the substance to be determined, with appropriate correction for fragment ions which are common to more than one of the known substances.

The scanning process with the analyzer 2 of FIGS. 8-9 requires approximately 2 minutes for scanning a mass spectrum ranging from 0 to 300 AMU. After scanning is done, the ion pump 16 is turned back on. At night, the heat wrap 85 is turned on, for example, by a diurnal timer, so that it will have baked out the system at night and the system will have cooled to operating temperatures in the morning.

To service the ion pump 16 and the turbomolecular pump 17 without breaking vacuum to the spectrometer unit 13, respective gate valves 88, 89 are provided for manually closing off the connections of the pumps to the spectrometer unit. The gate valves 88, 89 are Model No. SVB 1.53 VM supplied by Torr Vac. Products, Van Nuys, Calif.

In view of the above, an economical and portable mass analyzer has been described which uses a quadrupole mass spectrometer of increased sensitivity. A high sensitivity electron multiplier is used along with a mass correction lens arranged with respect to a sample inlet and a vacuum source so that the detection limit is greatly improved for the substances to be detected. Preferably the aperture area of the mass correction lens is variably adjustable and is set to a perdetermined optimum area for each substance under analysis. It is also preferred to adjust the electron multiplier high voltage value to a predetermined value for each ion mass to optimize the signal-to-noise ratio of detection. The small size and low cost of the mass analyzer enables it to be used economically for onsite sampling and monitoring or controlling industrial processes.

APPENDIX

MASS SPECTROMETER CONTROL PROGRAM FOR THE TEXAS INSTRUMENTS PROFESSIONAL COMPUTER BASIC VERSION 1.10

Copyright 1986 Coulston International Corp. and Gesellschaft Fur Strahlen-Und Umweltforschung mbH

```
1LIST   2RUN    3LOAD"  4SAVE"  5FILES  6CONT   7,"LPT1 8LOCATE 9COLOR  10PALET

BKGRND
Ok
LOAD"GSF
Ok
LIST
5 KEY OFF
6 CLEAR
10 DIM LI%(303)
15 DIM PKSEL(16,16)
20 DIM RANGED(13)
30 DIM AVALUE(301,3)
31 DIM X(300)
35 DIM TOP(13)
40 CLS
45 GOSUB 3000 '       INITILIZE
50 COLOR 2
60 LOCATE 1,10
70 K=41
90 GOTO 500   '       MASTER MENU
500 REM ******** SUBROUTINE MASTER MENU *********************
505 CLS:KEY OFF
510 LOCATE 3,23
515 COLOR 0,2,0,64
520 PRINT "
1LIST   2RUN    3LOAD"  4SAVE"  5FILES  6CONT   7,"LPT1 8LOCATE 9COLOR  10PALET

515 COLOR 0,2,0,64
520 PRINT " S Y S T E M   M E N U ";
525 COLOR 6,0,0,0
530 LOCATE 6,5
535 PRINT "F1 = Read Spectrum";
540 LOCATE 8,5
545 PRINT "F2 = Save Spectrum";
550 LOCATE 10,5
555 PRINT "F3 = Read Total Pressure";
560 LOCATE 12,5
565 PRINT "F4 = Display Background";
570 LOCATE 14,5
575 PRINT "F5 = Time Scan";
580 LOCATE 16,5
585 PRINT "F6 = Print Routines";
590 LOCATE 6,40
595 PRINT " F7 = Calibrate";
600 LOCATE 8,40
605 PRINT " F8 = View Spectrum";
610 LOCATE 10,40
615 PRINT " F9 = Initilize Diskette ";
620 LOCATE 12,40
625 PRINT "F10 = Standby ";
625 PRINT "F10 = Standby ";
1LIST   2RUN    3LOAD"  4SAVE"  5FILES  6CONT   7,"LPT1 8LOCATE 9COLOR  10PALET

615 PRINT " F9 = Initilize Diskette ";
620 LOCATE 12,40
625 PRINT "F10 = Standby ";
630 LOCATE 14,40
635 PRINT "F11 = Identify Spectrum";
640 LOCATE 16,40
645 PRINT "F12 = Exit to System";
650 LOCATE 24,40
655 COLOR 6,0
660 PRINT "  Selection ? ==>";:PRINT CHR$(219);
665 REM LOCATE 1,1,0:PRINT
670 KEY 1 "A"
```

```
675 KEY 2,"B"
680 KEY 3,"C"
685 KEY 4,"D"
690 KEY 5,"E"
695 KEY 6,"F"
700 KEY 7,"G"
705 KEY 8,"H"
710 KEY 9,"I"
715 KEY 10,"J"
720 KEY 11,"K"
725 KEY 12,"L"
730
1LIST   2RUN   3LOAD"  4SAVE"  5FILES  6CONT   7,"LPT1 8LOCATE 9COLOR  10PALET

730 IF RIGHT$(TIME$,2) = RIGHT$(TEME$,2) THEN 745 ELSE 735
735 LOCATE 1,32,0:COLOR 4,0,0,0:PRINT"TIME------":LOCATE 1,42:PRINT TIME$:TEME$=
TIME$
745 CMD$=INKEY$:IF CMD$="" THEN GOTO 730
750 IF CMD$ = "A" THEN GOTO 810
755 IF CMD$ = "B" THEN GOTO 835
760 IF CMD$ = "C" THEN GOTO 855
765 IF CMD$ = "D" THEN GOTO 875
770 IF CMD$ = "E" THEN GOTO 895
775 IF CMD$ = "F" THEN GOTO 920
780 IF CMD$ = "G" THEN GOTO 940
785 IF CMD$ = "H" THEN GOTO 965
790 IF CMD$ = "I" THEN GOTO 985
795 IF CMD$ = "J" THEN GOTO 1005
800 IF CMD$ = "K" THEN GOTO 1020
805 IF CMD$ = "L" THEN GOTO 1035
806 GOTO 500
810 REM ***** READ A SPECTRUM  ***************
815 COLOR 7,0:LOCATE 24,57:PRINT "F1"
820 GOSUB 1500
825 GOTO 45
830 REM ****************************************
835 REM ***** SAVE SPECTRUM  *****************
840
1LIST   2RUN   3LOAD"  4SAVE"  5FILES  6CONT   7,"LPT1 8LOCATE 9COLOR  10PALET

840 COLOR 7,0:LOCATE 24,57:PRINT "F2";
845 GOSUB 10000
850 GOTO 45
855 REM ****************************************
860 REM *****   READ TOTAL PRESSURE   ********
865 COLOR 7,0:LOCATE 24,57:PRINT "F3";
866 GOSUB 7500
867 OUT FUNC,CONSOLE+FIL+MULT
870 GOTO 730
875 REM ****************************************
880 REM *****   DISPLAY BACKGROUND  **********
885 COLOR 7,0:LOCATE 24,57:PRINT "F4";
887 GOSUB 26000
890 GOTO 45
895 REM ****************************************
900 REM *****  TIME SCAN  **********************
905 COLOR 7,0:LOCATE 24,57:PRINT "F5";
910 GOSUB 14000
915 GOTO 45
920 REM ***** PRINT SPECTRUM  ****************
925 COLOR 7,0:LOCATE 24,57:PRINT "F6";
930 GOSUB 13000
935 GOTO 45
940
1LIST   2RUN   3LOAD"  4SAVE"  5FILES  6CONT   7,"LPT1 8LOCATE 9COLOR  10PALET

940 REM ****************************************
945 REM ***** CALIBRATE  ********************
950 COLOR 7,0:LOCATE 24,57:PRINT "F7";
955 GOSUB 24000
960 GOTO 45
965 REM ****************************************
```

```
970 REM ***** VIEW SPECTRUM  *****************
975 COLOR 7,0:LOCATE 24,57:PRINT "F8";
977 GOSUB 10200
980 GOTO 45
985 REM ****************************************
990 REM ***** INITILIZE DISKETTE  ************
995 COLOR 7,0:LOCATE 24,57:PRINT "F9";
996 GOSUB 9000
1000 GOTO 45
1005 REM ****************************************
1010 REM ***** RESERVED  ************************
1015 COLOR 7,0:LOCATE 24,57:PRINT "F10";
1020 REM ******************************************
1025 REM ***** RESERVED *********************
1030 COLOR 7,0:LOCATE 24,57:PRINT "F11";
1032 GOSUB 40000
1033 GOTO 45
1035 REM ****************************************
1LIST   2RUN    3LOAD"   4SAVE"   5FILES   6CONT    7,"LPT1 8LOCATE 9COLOR   10PALET

1035 REM ******************************************
1040 REM *****   EXIT TO SYSTEM **************
1045 COLOR 7,0:LOCATE 24,57:PRINT "F12";
1050 CLS
1055 EN$=CHR$(13)
1060 KEY 1,"LIST "
1065 KEY 2,"RUN"+EN$
1070 KEY 3,"LOAD"+CHR$(32)+CHR$(34)
1075 KEY 4,"SAVE"+CHR$(32)+CHR$(34)
1080 KEY 5,"FILES"+EN$
1085 KEY 6,"CONT"+EN$
1090 KEY 7,","+CHR$(34)+"LPT1"
1095 KEY 8,"LOCATE ,,1"
1100 KEY 9,"COLOR 7,0,0,0"
1105 KEY 10,"PALETTE"
1110 COLOR 7,0,0,0
1115 KEY OFF
1120 SYSTEM
1500 GOSUB 11000'                   PRINT HEADER AND COLLECT VALUES
1735 GOSUB 8921 'LOAD AVALUE(X,0) WITH BACKGROUND
1740 FOR E=ASTART TO AEND
1750 GOSUB 6000 '          BUMP THE AMU
1752 COLOR 4,0:LOCATE 1,42,0:PRINT TIME$
1752 COLOR 4,0:LOCATE 1,42,0:PRINT TIME$
1LIST   2RUN    3LOAD"   4SAVE"   5FILES   6CONT    7,"LPT1 8LOCATE 9COLOR   10PALET
 0

1752 COLOR 4,0:LOCATE 1,42,0:PRINT TIME$
1753 LOCATE 3,22:PRINT R
1760 GOSUB 2000 '          READ IT
1770 GOSUB 4000 '          PLOT IT
1780 NEXT E
1790 GOSUB 7700 '          ZERO THE DAC
1800 A$=INKEY$:IF A$="" THEN LOCATE 1,42:PRINT TIME$:GOTO 1800
1810 IF ASC(A$)<>13 THEN BEEP:GOTO 1800
1820 EFLAG=1
1850 RETURN
2000 '*** SUBROUTINE TO READ AMP/TORR METER *************
2001 IF R>12 THEN R=12
2002 IF R<5 THEN R=5
2010 OUT RANGE,RANGED(R)
2020 IF AIT=0 THEN GOTO 2040
2025 FOR A=1 TO 1000
2030 NEXT A
2035 AIT=0
2040 FOR DEL=1 TO 300:NEXT DEL
2080 WAIT &H208,254,255
2100 STATUS=INP(&H208):OVERRANGE=SGN(STATUS AND 2^2)
2120 IF OVERRANGE=1 THEN GOTO 2530
2140 WAIT &H208,254,255
2160 DIGIT01=INP(&H205):0
```

```
2180 IF OK=0 THEN GOTO 2140
2200 WAIT &H208,254,255
2220 DIGIT02=INP(&H205):OK=SGN(DIGIT02 AND 2^6)
2240 IF OK=0 THEN GOTO 2200
2260 WAIT &H208,254,255
2280 STATUS=INP(&H208)
2300 DIGIT03=INP(&H205):OK=SGN(DIGIT03 AND 2^7)
2320 IF OK=0 THEN GOTO 2260
2340 OVERRANGE=SGN(STATUS AND 2^2)
2360 IF OVERRANGE=1 THEN GOTO 2470
2380 DIGIT1A=15 AND DIGIT01
2400 DIGIT2A=15 AND DIGIT02
2420 DIGIT3A=15 AND DIGIT03
2440 VALUE=DIGIT1A+(DIGIT2A *.1)+(DIGIT3A *.01)
2460 REM IF CHECK=0 THEN GOTO 2500
2470 IF VALUE<.8 AND VALUE=0 THEN R=R+1:IF R=13 AND VALUE<.8 THEN 2500:IF R=13 T
HEN 2500:AIT=1:GOTO 2000
2480 IF VALUE>9.5 THEN R=R-1:AIT=1:GOTO 2000
2490 IF VALUE=0 THEN R=R-2:AIT=1:GOTO 2000
2500 AVALUE(E,1)=VALUE
2515 AVALUE(E,2)=VALUE*10^-R
2520 GOTO 2570
2530 'VALUE=9.99
2530 'VALUE=9.99


2540 REM BEEP
2550 AIT=1
2560 GOTO 2460
2570 RETURN
3000 REM
3020 REM
3040 REM
3060 REM**************DEFINE I/O ********************
3080 REM*******************************************
3100 LET FUNC=&H206 'OUTPUT CHANNEL 0206 "FUNCTION"
3120 REM ****************************************
3140 LET EXT=2         '              D1  1=HOLD DATA                       0
3160 LET KV3=4         '              D2  1=ACTIVE                          0
3180 LET FIL=8         '              D3  0= FILAMENT OFF(NEED PULL-UP)     1
3200 LET TP=16         '              D4  1=SELECTED                        0
3220 LET MULT=32       '              D5  1=SELECTED                        0
3240 LET FAR=64        '              D6  1=SELECTED                        0
3260 LET CONSOLE=128   '              D7  0=CONSOLE OFF(NEED PULL-UP)       1
3280 LET K=41
3290 TOP(4)=10000!
3300 LET AIT=0
3301 TOP(5)=100000!
3302 TOP(6)=1000000!
3303


3304 TOP(8)=1E+08
3305 TOP(9)=1E+09
3306 TOP(10)=1E+10
3307 TOP(11)=1E+11
3308 TOP(11)=1E+11
3309 TOP(12)=1E+12
3310 RA=8
3320 REM            INIT.VALUE                                 HEX 88
3340 LET RANGE=&H207   'OUTPUT CHANNEL 0207 "RANGE SWITCH"
3360 LET X10.5=8
3380 LET RANGED(5)=8
3400 LET X10.6=9
3420 LET RANGED(6)=9
3440 LET X10.7=4
3460 LET RANGED(7)=4
3480 LET X10.8=5
3500 LET RANGED(8)=5
3520 LET X10.9=2
3540 LET RANGED(9)=2
3560 LET X10.10=3
3580 LET RANGED(10)=3
```

```
3600 LET X10.11=0
3620 LET RANGED(11)=0
3620 LET RANGED(11)=0


3620 LET RANGED(11)=0
3640 LET X10.12=1
3660 LET RANGED(12)=1
3680 LET R=5
3700 REM            INIT.VALUE                                        HEX 0
3720 LET DAC12LSB=&H200'       12 BIT DAC LSB                             0
3740 LET DAC12MSB=&H201'       12 BIT DAC MSB                             0
3760 LET DAC16LSB=&H202'       16 BIT DAC LSB                             0
3780 LET DAC16MSB=&H203'       16 BIT DAC MSB                             0
3800 OUT RANGE,RANGED(R)
3820 CHECK=0
3822 AFLAG=0
3840 OUT DAC12LSB,0
3860 OUT DAC12MSB,0
3880 OUT DAC16LSB,0
3900 OUT DAC16MSB,0
3920 LET IREAD=&H205'           READ CHANNEL PICOAMMETER
3960 LET MISC=&H208'           READ CHANNEL MISC. FUNCTIONS
3980 RETURN
4000 REM ********* SUBROUTINE TO PLOT A GRAPH ****************
4020 REM
4040 REM
4060 ARANGE=AVALUE(E,2)-AVALUE(E,0)
4065


4070 'IF ARANGE<0 THEN ARANGE=0
4075 AVALUE(E,1)=ARANGE
4080 START=ARANGE*TOP(RA-1)*240'LPRINT E" "START"  ";
4100 TEP=(600/(AEND-ASTART))
4110 IF START>240 THEN START=240:LINE(K-(TEP*.1),Y1)-(K+(TEP*.1),Y1-6),2,BF
4120 LINE(K-(TEP * .1),(Y2)-START)-(K+(TEP * .1),Y2-2),6,BF
4140 K=K+TEP
4160 RETURN
5000 REM DIM LI%(303)'**** MARKER SUBROUTINE  ***************************
5020 X1=41:X2=641
5040 Y1=286
5060 Y2=299
5080 N=X1-30:MARK=ASTART
5100 LINE (N,Y1+8)-(N,Y2),7,B
5101 LINE (N,Y1)-(N-5,Y1+8),7
5102 LINE (N,Y1)-(N+5,Y1+8),7
5103 LINE (N-5,Y1+8)-(N+5,Y1+8),7:PAINT (N,Y1+2),2,7
5120 GET (N-5,Y1)-(N+5,Y2),LI%
5140 PUT (N-5,Y1),LI%,XOR
5150 LOCATE 1,77:COLOR 0,4,0,16:PRINT "    "
5160 N=X1
5180 PUT (N-5,Y1),LI%,XOR
5200 COLOR 6,0,0,16:KEY OFF:LOCATE 14,73,0,12:PRINT MARK;
5210 LOCATE 15,73:PRINT
5200 COLOR 6,0,0,16:KEY OFF:LOCATE 14,73,0,12:PRINT MARK;
5210 LOCATE 15,73:PRINT USING"#.##^^^^";AVALUE(MARK,1)'-AVALUE(MARK,0)
5211 COLOR 7,0,0,0
5220 A$=INKEY$:IF A$<>""THEN 5220
5225 LOCATE 1,42:PRINT TIME$:A$=INKEY$:IF A$="" THEN 5225 ELSE IF LEN(A$)>1 THEN
 A$=RIGHT$(A$,1)
5238 REM
5239 REM
5240 IF ASC(A$)=72 THEN RA=RA+1:GOSUB 19000:GOTO 5020
5250 IF ASC(A$)=80 THEN RA=RA-1:GOSUB 19000:GOTO 5020
5260 IF ASC(A$)=77 THEN 5320
5280 IF ASC(A$)=75 THEN 5420
5300 IF ASC(A$)=13 THEN PUT (N,Y1),LI%,XOR:GOTO 5520
5310 GOTO 5220
5320 PUT (N-5,Y1),LI%,XOR
5340 N=N+TEP:MARK=MARK+1
5360 IF N>X2 THEN N=X2
```

```
5370 IF MARK>AEND THEN MARK=AEND
5380 PUT (N-5,Y1),LI%,XOR
5400 GOTO 5200
5420 PUT (N-5,Y1),LI%,XOR
5440 N=N-TEP:MARK=MARK-1
5460 IF N<X1 THEN N=X1
5470
1LIST   2RUN    3LOAD"  4SAVE"  5FILES  6CONT   7,"LPT1 8LOCATE 9COLOR  10PALET


5480 PUT (N-5,Y1),LI%,XOR
5500 GOTO 5200 -
5520 RETURN
6000 REM ************ SUBROUTINE TO CALCULATE DAC VALUE-AMU******
6020 A#=10#
6040 B#=65535#
6060 C#=.03333333#
6080 D#=A#/B#
6100 AMU#=.0333333#
6120 RESULT#=E*AMU#/D#
6140 B$=HEX$(RESULT#)
6160 B=16
6180 LSB$=RIGHT$(B$,2)
6200 L=LEN(LSB$):D=0
6220 FOR I=1 TO L
6240 A=ASC(MID$(LSB$,I,1))
6260 IF A > 64 THEN A=A-55:GOTO 6300
6280 A=A-48
6300 D=D+A*B^(L-I)
6320 NEXT I
6340 RES=ABS(RESULT#)
6360 REA=CINT((RES-D)/256)
6380 OUT &H202,D
6400
1LIST   2RUN    3LOAD"  4SAVE"  5FILES  6CONT   7,"LPT1 8LOCATE 9COLOR  10PALET

6380 OUT &H202,D
6400 OUT &H203,REA
6420 RETURN
7500 REM ***********SUBROUTINE TO READ PRESSURE *****************
7505 REM R=8:OUT RANGE,RANGED(R)
7510 OUT FUNC,CONSOLE+FIL+TP
7515 R=11:OUT RANGE,RANGED(R):FOR Q=1 TO 20:NEXT Q
7516 COLOR 4,0
7517 LOCATE 1,32:PRINT"TIME------        "
7518 LOCATE 1,42:PRINT TIME$
7520 GOSUB 2000
7521 TPRESS=VALUE
7522 RPRESS=R
7530 COLOR 4,0
7540 LOCATE 2,32:PRINT"PRESSURE-- .  X10-  "
7550 LOCATE 2,42:PRINT USING"#.##";VALUE;
7560 LOCATE 2,50:PRINT R-4
7571 REM
7572 REM
7573 R=7
7580 OUT RANGE,RANGED(R)
7585 '
7590 RETURN
7590 RETURN
1LIST   2RUN    3LOAD"  4SAVE"  5FILES  6CONT   7,"LPT1 8LOCATE 9COLOR  10PALET

7700 OUT DAC16MSB,0
7720 OUT DAC16LSB,0
7740 RETURN
8000 REM ************* SUBROUTINE TO CREATE A  FILE NAME IN THE CROSS REFERENCE
8020 REM                  TABLE FILE ********************************************
8040 OPEN "R",#1,"LOOKUP.TAB",40
8060 FIELD #1,8 AS OK$,4 AS TP$,4 AS SS$,4 AS SE$,10 AS DE$,8 AS TE$
8080 GET #1,1 '                          ***ALLOCATE FIELDS IN BUFFER*******
8100 COUN=CVI(OK$)
8120 IF COUN<=0 THEN PRINT "NO FILE AVAILIABLE":GOTO 8360
```

```
8140 K1=COUN+1
8160 LSET OK$=MKI$(K1)
8180 PUT #1,1
8200 LSET OK$=AME$
8220                                        ***MOVE DATA INTO THE RECORD BUFFER**
8240 LSET DE$=DATE$
8260 LSET TE$=TIME$
8280 LSET TP$=MKS$(TPRESS)
8300 LSET SS$=MKS$(ASTART)
8320 LSET SE$=MKS$(AEND)
8340 PUT #1,K1
8350 CLOSE #1
8360 RETURN
840
1LIST   2RUN    3LOAD"   4SAVE"   5FILES   6CONT    7,"LPT1 8LOCATE 9COLOR   10PALET

8400 OPEN "R",#1,"LOOKUP.TAB",40 '****SUBROUTINE TO SHOW THE DIRECTORY*****
8420 FIELD #1,8 AS OK$,4 AS TP$,4 AS SS$,4 AS SE$,10 AS DE$,8 AS TE$
8421 GET #1,1
8422 COUN=CVI(OK$):CLS
8423 ASTART=CVI(SS$)
8424 AEND=CVI(SE$)
8430 PRINT "#"TAB(6)"PGM NAME"TAB(20)"RNG"TAB(25)"START"TAB(32)"END"TAB(40)"DAT
"TAB(51)"TIME":PRINT
8440 FOR K1=2 TO COUN
8460 GET #1,K1
8461 PRINT USING"###";K1;
8462 PRINT TAB(5);
8463 PRINT "=";
8464 PRINT TAB(7);
8465 PRINT OK$;
8466 PRINT TAB(20);
8467 PRINT USING"##";CVS(TP$);
8468 PRINT TAB(25);
8469 PRINT USING"###";CVS(SS$);
8470 PRINT TAB(31);
8471 PRINT USING"###";CVS(SE$);
8472 PRINT TAB(37);
8473 PRINT DE$;
8474 PRINT T
1LIST   2RUN    3LOAD"   4SAVE"   5FILES   6CONT    7,"LPT1 8LOCATE 9COLOR   10PALET

8475 PRINT TE$
8500 NEXT K1
8520 REM CLOSE #1
8540 RETURN
8600 OPEN "R",#2,AME$,14   '**** SUBROUTINE TO STORE THE CONTENTS OF AVALUE(X,2)
8635 FIELD #2,14 AS AMUN$  '**** ON DISK. ENTER WITH ASTART AND AEND INITIALIZED
8640 FOR CL=ASTART TO AEND '**** FILE NAME IN AME$
8660 LSET AMUN$=MKS$(AVALUE(CL,2))
8680 PUT #2,CL
8700 NEXT CL
8720 CLOSE #2
8740 RETURN
8800 REM     ********************** SUBROUTINE TO READ THE NAME OF DATA FILE
8801 REM                          * OUT OF THE CROSS REFERENCE FILE CALLED
8802 REM                          * LOOKUP.TAB,IDENTIFIED BY NRME,REMOVE
8803 REM                          * ASTART,AEND DATA, AND XFER THE DATA TO THE
8804 REM                          * ARRAY AVALUE(X,2)
8805 REM     ***************************************************************
8807 GET #1,NRME
8808 AME$=OK$
8810 ASTART=CVS(SS$)
8812 AEND=CVS(SE$)
8812 AEND=CVS(SE$)
1LIST   2RUN    3LOAD"   4SAVE"   5FILES   6CONT    7,"LPT1 8LOCATE 9COLOR   10PALET

8810 ASTART=CVS(SS$)
8812 AEND=CVS(SE$)
8819 OPEN "R",#2,AME$,14
8820 FIELD #2,14 AS AMUN$
```

```
8823 CLOSE #1
8840 FOR CL=ASTART TO AEND
8860 GET #2,CL
8880 AVALUE(CL,2)=CVS(AMUN$)
8900 NEXT CL
8920 CLOSE #2
8921 OPEN "R",#2,"BKGRND",14 '**  SUBROUTINE TO READ THE BACKGROUND DATA
8922 FIELD #2,14 AS AMUN$    '**  STORED IN "BKGRND" FILE AND PLACE IT IN
8924 FOR CL=1 TO 300         '**  THE ARRAY AVALUE(X,2)
8925 GET #2,CL
8926 AVALUE(CL,0)=CVS(AMUN$):AVALUE(CL,3)=CL
8927 NEXT CL
8928 CLOSE #2
8940 RETURN
9000 CLS:LOCATE 10,40,0:PRINT"ACKNOWLEDGE WITH Yes OR No"
9001 AS$=INKEY$
9002 IF LEN(AS$)=0 THEN 9001
9003 IF ASC(AS$)=78 THEN RETURN
9004 IF ASC(AS$)=89 THEN 9019
9004 IF ASC(AS$)=89 THEN 9019
1LIST   2RUN   3LOAD"   4SAVE"   5FILES   6CONT   7,"LPT1 8LOCATE 9COLOR  10PALET

9003 IF ASC(AS$)=78 THEN RETURN
9004 IF ASC(AS$)=89 THEN 9019
9005 BEEP:GOTO 9001
9019 OPEN "R",#1,"LOOKUP.TAB",40
9020 FIELD #1,8 AS OK$,4 AS TP$,4 AS SS$,4 AS SE$,10 AS DE$,8 AS TE$
9040 INIT=2
9060 LSET OK$=MKI$(INIT)
9080 PUT #1,1
9100 CLOSE
9120 RETURN
10000 CLS ' ########  SUBROUTINE TO INPUT THE NAME OF A FILE TO BE SAVED
10005 INPUT ;"NAME";AME$
10010 GOSUB 8000
10020 GOSUB 8600
10030 RETURN
10200 REM NE$="LOOKUP.TAB" '###  SUBROUTINE TO CALL (SHOW DIRECTORY) AND THEN
10210 GOSUB 8400           '###  INPUT THE NAME OF FILE TO BE USED BY (VIEW
10215 LOCATE 23,5          '###  SPECTRUM)
10220 INPUT;"SPECTRUM DESIRED";NAME
10230 GOSUB 8800 '           ### GET THE STARTING VALUES (ASTART,AEND,ETC)
10240 GOSUB 20000
10245 EFLAG=1
10250 RETURN
11000 CLS:LOCATE 1,77:C
1LIST   2RUN   3LOAD"  4SAVE"  5FILES  6CONT   7,"LPT1 8LOCATE 9COLOR  10PALET

10250 RETURN
11000 CLS:LOCATE 1,77:COLOR 0,2,0,80:PRINT"WAIT"
11020 COLOR 4,0,0,0
11040 LOCATE 1,11:PRINT"START------    AMU";
11042 LOCATE 2,11:PRINT"WIDTH------    AMU";
11044 LOCATE 3,11:PRINT"RANGE 1X10-    AMP";
11060 LOCATE 1,32:PRINT"TIME------"
11080 LOCATE 2,32:PRINT"PRESSURE-- .  X10-  "
11100 LOCATE 3,32:PRINT"GAIN------"
11120 LOCATE 1,55:PRINT"DATE------"
11140 LOCATE 2,55:PRINT"OPERATOR--"
11160 LOCATE 3,55:PRINT"IDENTITY--"
11165 IF FLAG1=1 THEN 11525
11180 LOCATE 1,22,1,0,12 '                    ** GET START SCAN
11200 GOSUB 12500
11220 ASTART=VAL(RESPONSE$)
11225 IF ASTART<1 OR ASTART>299 THEN 11180
11240 LOCATE 2,22,1:GOSUB 12500  '         ** GET WIDTH (START+WIDTH=END SCAN)
11260 WIDE=VAL(RESPONSE$):AEND=ASTART + WIDE
11265 IF AEND<0 OR AEND>300 THEN 11240
11270 IF ASTART>AEND THEN 11180
11280 LOCATE 3,22,1:GOSUB 12500  '         ** GET RANGE
11440 RA=VAL(RESPONSE$):R=RA
```

```
11440 RA=VAL(RESPONSE$):R=RA
1LIST   2RUN    3LOAD"  4SAVE"  5FILES  6CONT   7,"LPT1 8LOCATE 9COLOR  10PALET

11460 LOCATE 2,65,1:GOSUB 12500  '          ** GET OPERATOR
11465 IF LEN(RESPONSE$)>14 THEN 11460
11480 OPER$=RESPONSE$,
11500 LOCATE 3,65,1:GOSUB 12500  '          ** GET IDENTITY
11505 IF LEN(RESPONSE$)>8 THEN 11500
11520 IDEN$=RESPONSE$
11525 LOCATE 1,42,0:PRINT TIME$
11526 LOCATE 1,22,0:PRINT ASTART
11527 LOCATE 2,22,0:PRINT AEND-ASTART
11528 LOCATE 2,42,0:PRINT USING"#.##";TPRESS;:LOCATE 2,50,1:PRINT RPRESS;
11530 LOCATE 1,65,0:PRINT DATE$
11535 LOCATE 3,42,0:PRINT GAIN
11540 GOSUB 15000'     GO WRITE THE SCREEN
11560 REM GOSUB 7500 '      READ THE TOTAL PRESSURE
11580 OUT FUNC,CONSOLE+FIL+MULT
11620 RETURN
11640 '
11660 '
11680 '
11700 '
11720 '
11740 '
11760 '
11780
1LIST   2RUN    3LOAD"  4SAVE"  5FILES  6CONT   7,"LPT1 8LOCATE 9COLOR  10PALET

11780 '
11800 '
11820 '
11840 '
11860 '
11880 '
11900 '
11920 '
11940 '
11960 '
12000 REM
12020 REM
12040 REM
12060 REM
12100 REM
12120 REM
12140 REM
12160 REM
12220 REM
12240 REM
12500 RESPONSE$=""  '*********SUBROUTINE TO INPUT VALUES *********
12510 A$=INKEY$:IF LEN(A$)=0 THEN 12540
12530 PRINT A$;
12535 IF AS
1LIST   2RUN    3LOAD"  4SAVE"  5FILES  6CONT   7,"LPT1 8LOCATE 9COLOR  10PALET

12530 PRINT A$;
12535 IF ASC(A$)=13 THEN RETURN
12540 RESPONSE$=RESPONSE$+A$
12550 GOTO 12510 '**********************************************
12560 REM
13000 REM ********ROUTINE FOR TABULAR PRINTOUT OF SPECTRUM ***************
13005 CLS:RI=80:LEF=560:TOP=80:BOT=292:BLA=106
13007 LOCATE 1,77:COLOR 0,2,0,80:PRINT "WAIT"
13008 COLOR 6,0,0,0
13010 LINE (RI,80)-(LEF,80),1         'TOP LINE
13020 LINE (RI,100)-(LEF,BLA),1,BF    '2ND THICK LINE
13030 LINE (RI,124)-(LEF,124),1       '3RD
13040 LINE (RI,148)-(LEF,148),1       '4TH
13050 LINE (RI,172)-(LEF,172),1       '5TH
13060 LINE (RI,196)-(LEF,196),1       '6TH
13070 LINE (RI,220)-(LEF,220),1       '7TH
13080 LINE (RI,244)-(LEF,244),1       '8TH
```

```
13090 LINE (RI,268)-(LEF,268),1        '9TH
13100 LINE (RI,292)-(LEF,292),1        '10TH
13110 LINE (140,BLA)-(140,BOT),1
13120 LINE (LEF,TOP)-(LEF,BOT),1       'LEFTMOST
13130 LINE (RI,TOP)-(RI,BOT),1         'RIGHTMOST
13140 LINE (254,BLA)-(254,BOT),1
13150 LINE (37
1LIST  2RUN  3LOAD"  4SAVE"  5FILES  6CONT  7,"LPT1 8LOCATE 9COLOR  10PALET

13150 LINE (370,BLA)-(370,BOT),1
13160 LOCATE 8,11:PRINT"MASS"
13170 LOCATE 8,17:PRINT"INTENSITY";
13180 LOCATE 8,30:PRINT"CALCULATED";
13190 LOCATE 8,44:PRINT"BACKGROUND";
13200 IF EFLAG=0 THEN LOCATE 24,60:PRINT "NO DATA AVAILABLE";:FOR DEL=1 TO 2000
NEXT DEL:GOTO 13570
13210 '
13220 '
13230 '
13240 N1=ASTART
13250 S=0  '***********************************  SORT  *******************
13260 '
13270 FOR I=N1 TO AEND
13280 IF AVALUE(I,2) <= AVALUE(I+1,2) OR I=285 THEN 13330
13290 Z=AVALUE(I,2):X=AVALUE(I,3)
13300 AVALUE(I,2)=AVALUE(I+1,2):AVALUE(I,3)=AVALUE(I+1,3)
13310 AVALUE(I+1,2)=Z:AVALUE(I+1,3)=X
13320 S=1
13330 NEXT I
13340 IF S=1 THEN 13250  '***************************** END SORT  *********
13341 '
13342 '
13342 '
1LIST   2RUN 3LOAD" 4SAVE" 5FILES 6CONT   7,"LPT1 8LOCATE 9COLOR  10PALET

13343 '
13344 '
13350 AB=AEND+1:AC=AEND-6
13360 TEMP2=0
13370 FOR I=ASTART TO AEND
13380 TEMP2=TEMP2+AVALUE(I,1)
13390 NEXT I
13395 MAXPK=AVALUE(AB,2)
13400 FOR I=AB TO AC STEP-1
13405 'IF AVALUE(I,1)=0 THEN X(I)=1E-13:GOTO 13420
13410 X(I)=(AVALUE(I,2)/MAXPK)*100
13420 NEXT I
13430 '
13440 '
13450 INC=0
13460   AB=ASTART:AC=ASTART+7
13470 FOR I=AEND+1 TO AEND-6 STEP-1
13480 LOCATE 10+INC,11:PRINT AVALUE(I,3);'MASS
13490 LOCATE 10+INC,17:PRINT USING "#.##^^^^-";AVALUE(I,2);'INTENSITY
13500 LOCATE 10+INC,30:PRINT USING "###.##%";ABS(X(I));'CALCULATED
13510 LOCATE 10+INC,44:PRINT USING "#.##^^^^-";AVALUE(I,0);'BACKGROUND
13520 INC=INC+2
13530 NEXT I
1353
1LIST   2RUN 3LOAD" 4SAVE" 5FILES  6CONT   7,"LPT1 8LOCATE 9COLOR  10PALET

13530 NEXT I
13535 LOCATE 1,77:COLOR 0,4,0,16:PRINT "   "
13536 COLOR 6,0,0,0
13540 A$=INKEY$:IF A$<>"" THEN 13540
13542 A$=INKEY$:IF A$="" THEN 13542 ELSE IF LEN(A$)>1 THEN A$=RIGHT$(A$,1)
13550 IF ASC(A$)=13 THEN 13570
13560 GOTO 13540
13570 RETURN
```

```
14000 REM    **************** TIME SCAN SUBROUTINE ********************
14010 CLS:COLOR 6,0,0,0:IND=1:AFLAG=0
14020 LOCATE 1,67:PRINT"TIME SCAN"
14030 FOR I=4 TO 10 STEP 2
14040 LOCATE I,67:PRINT"PEAK"I/2-1;:COLOR 7,0,0,16:LOCATE I,74:PRINT"    ";
14050 LINE(702,(I-1)*12)-(719,(I-1)*(12)+(10)),I-3,BF
14060 '
14070 KEY OFF
14080 LOCATE I,74
14090 GOSUB 12500
14100 PKSEL(IND,0)=VAL(RESPONSE$)
14110 IF PKSEL(IND,0)>285 THEN 14080
14120 IF PKSEL(IND,0)<1 THEN PKSEL(IND,0)=0
14130 IND=IND+1
14140 COLOR 6,0,0,0
14140 COLOR 6,0,0,0
1LIST   2RUN  3LOAD" 4SAVE" 5FILES  6CONT   7,"LPT1 8LOCATE 9COLOR  10PALET

14140 COLOR 6,0,0,0
14150 NEXT I
14160 LOCATE 16,67:PRINT"PERIOD"
14170 LOCATE 17,67:PRINT"____ SECONDS":LOCATE 17,67:GOSUB 12500
14172 IF VAL(RESPONSE$)=0 THEN PER=60:GOTO 14175
14173 PER=VAL(RESPONSE$)
14175 LOCATE 17,67:PRINT PER" SECONDS"
14180 IF PER<10 OR PER>900 THEN 14160 'MIN. 12 SECS
14190 LOCATE 12,67:PRINT"TOTAL TIME
14200 LOCATE 13,67:PRINT PER*540/60" MINUTES"
14210 LOCATE 14,67:PRINT USING "##.##";PER*540/60/60:LOCATE 14,73:
      PRINT" HOURS"
14220 TOP=6:LEFT=41:BOT=246:RIGHT=581
14230 'LINE(LEFT,TOP)-(LEFT,BOT),2
14240 'LINE(LEFT,BOT)-(RIGHT,BOT),2
14250 FOR AQ=TOP TO BOT STEP 24
14260 LINE (LEFT-5,AQ)-(RIGHT,AQ),2
14270 NEXT AQ
14280 INC=9:ZAHL=0:KEY OFF
14290 FOR A=LEFT TO RIGHT STEP INC
14300 LINE (A,BOT+5)-(A,TOP),2
14310 NXT=A/9:LOCATE 23,67:PRINT"M I N U T E S"
14320 LOCATE 22,NXT:PRINT MID$(STR$(ZAHL),2,1);
14330 REM IF ZAHL<=9 THEN 14390

1LIST  2RUN   3LOAD"  4SAVE"  5FILES  6CONT   7,"LPT1 8LOCATE 9COLOR  10PALET

14330 REM IF ZAHL<=9 THEN 14390
14340 LOCATE 23,NXT:PRINT MID$(STR$(ZAHL),3,1);
14350 REM IF ZAHL<=99 THEN 14390
14360 LOCATE 24,NXT:PRINT MID$(STR$(ZAHL),4,1);
14370 REM IF ZAHL<=999 THEN 14390
14380 LOCATE 25,NXT:PRINT MID$(STR$(ZAHL),5,1);
14390 ZAHL=ZAHL+PER*9/60
14400 NEXT A
14410 REM
14420 FOR EW=1 TO 21 STEP 2
14430 READ ZAHL
14440 LOCATE EW,2:PRINT USING "##";ZAHL
14460 NEXT EW
14470 DATA 10,9,8,7,6,5,4,3,2,1,0
14480 RESTORE
14489 GH=0:RA=11
14490 FOR PLOTT=LEFT TO RIGHT
14500 FOR IND=1 TO 4
14510 '
14520 E=PKSEL(IND,0):IF E=0 THEN 14560
14525 GOSUB 6000
14527 IF AFLAG=1 THEN R=PKSEL(IND+4,1)
14530 GOSUB 2000
1
```

```
1LIST   2RUN    3LOAD"  4SAVE"  5FILES  6CONT   7,"LPT1 8LOCATE 9COLOR  10PALET

14527 IF AFLAG=1 THEN R=PKSEL(IND+4,1)
14530 GOSUB 2000
14540 IF AFLAG = 0 THEN PKSEL(IND+4,1)=R
14545 '
14550 PKSEL(IND,1)=VALUE*10^-R
14560 NEXT IND
14565 COL=4
14570 FOR IND=1 TO 4
14572 IF PKSEL(IND,0)=0 THEN 14610
14575 RU=PKSEL(IND+4,1)-1
14580 PINT=PKSEL(IND,1)*TOP(RU)*240
14590 PSET(PLOTT,BOT-PINT),COL-3
14600 COL=COL+2
14610 NEXT IND
14612 AFLAG=1
14615 GH=GH+1
14620 GOSUB 14960
14630 ASAVE=TIMER
14640 GOSUB 14960
14650 IF TIMER<ASAVE+PER THEN 14640
14651 A$=INKEY$
14652 IF LEN(A$)=0 THEN 14660
14653 IF ASC(A$)=13 THEN 14665

1LIST   2RUN    3LOAD"  4SAVE"  5FILES  6CONT   7,"LPT1 8LOCATE 9COLOR  10PALET

14653 IF ASC(A$)=13 THEN 14665
14660 NEXT PLOTT
14665 IND=5
14670 FOR I= 5 TO 11 STEP 2
14680 LOCATE I,67:PRINT"9.99*10^-"PKSEL(IND,1)
14690 IND=IND+1
14700 NEXT I
14720 FOR DEL=1 TO 30
14730 BEEP
14740 NEXT DEL
14760 A$=INKEY$
14770 IF LEN(A$)=0 THEN 14760
14780 IF ASC(A$)<>13 THEN 14760
14790 RETURN
14800 '
14805 '
14810 '
14820 '
14830 '
14840 '
14850 '
14860 '
14870 '

1LIST   2RUN    3LOAD"  4SAVE"  5FILES  6CONT   7,"LPT1 8LOCATE 9COLOR  10PALET

14860 '
14870 '
14880 '
14890 '
14900 '
14910 '
14920 '
14930 '
14940 '
14950 '
14960 REM ************  SUBROUTINE TO RETURN THE PRESENT TIME IN SECONDS ***
14970 TIMER=VAL(RIGHT$(TIME$,2)):LOCATE 25,1
14980 TIMER=TIMER+(VAL(MID$(TIME$,4,2))*60)
14990 TIMER=TIMER+(VAL(LEFT$(TIME$,2))*3600)
14995 RETURN
15000 REM  ****** SUBROUTINE  TO CREATE A SCALED GRAPH *********
15020 REM CLS
15040 FULL=AEND-ASTART
```

```
15060 FEIN=600/FULL
15080 MEDIUM=FEIN*5
15100 GROB=MEDIUM*4
15120 COLOR 7,0,0,0
15140 PALETTE
15140 PALETTE
1LIST   2RUN    3LOAD"   4SAVE"   5FILES   6CONT   7,"LPT1 8LOCATE 9COLOR  10PALET

15140 PALETTE
15160 X1= 41:Y1=42:X2=641:Y2=282
15180 COLOR 2,0,0,0
15200 REM LINE (X1,Y1)-(X2,Y1)  'TOP LINE
15220 FOR D=Y1 TO Y2 STEP 24
15240 LINE(X1,D)-(X2,D)          'MITTLE LINES
15260 NEXT D
15261 COLOR 6,0
15262 LOCATE 4,2:PRINT"10";
15263 LOCATE 6,3:PRINT"9";
15264 LOCATE 8,3:PRINT"8";
15265 LOCATE 10,3:PRINT"7";
15266 LOCATE 12,3:PRINT"6";
15267 LOCATE 14,3:PRINT"5";
15268 LOCATE 16,3:PRINT"4";
15269 LOCATE 18,3:PRINT"3";
15270 LOCATE 20,3:PRINT"2";
15271 LOCATE 22,3:PRINT"1";
15272 LOCATE 24,3:PRINT"0";
15280 COLOR 7,0,0,0
15300 ' FOR W=X1    TO X2 STEP GROB
15320 ' LINE(W,Y2+2)-(W,Y2+15)
15340 ' NEXT W

1LIST   2RUN    3LOAD"   4SAVE"   5FILES   6CONT   7,"LPT1 8LOCATE 9COLOR  10PALET

15360 ' FOR W=X1    TO X2 STEP MEDIUM
15380 ' LINE(W,Y2+2)-(W,Y2+8)
15400 ' XT W
15420 IF FEIN < 3 THEN GOTO 15500
15440 FOR W=X1 TO X2 STEP FEIN
15460 LINE(W,Y2+2)-(W,Y2+4)
15480 NEXT W
15500 REM
15620 RETURN
19000 IF AEND-ASTART=0 THEN LOCATE 12,40,0:PRINT"NO DATA AVAILABLE":GOTO 22020
19001 IF RA>12 THEN RA=12
19002 IF RA<5 THEN RA=5
19003 CLS:FLAG1=1:GOSUB 11000
19004 FLAG1=0
19005 LOCATE 3,22:PRINT RA
19006 LOCATE 3,65:PRINT AME$
19007 LOCATE 2,22:PRINT AEND
19008 LOCATE 2,65:PRINT OPER$
19010 GOSUB 15000
19020 K=41
19040 FOR E=ASTART TO AEND
19060 GOSUB 4000
19080 NEXT E
19100
1LIST   2RUN    3LOAD"   4SAVE"   5FILES   6CONT   7,"LPT1 8LOCATE 9COLOR  10PALET

19080 NEXT E
19100 RETURN
20000 IF AEND-ASTART=0 THEN LOCATE 12,40,0:PRINT"NO DATA AVAILABLE":GOTO 22020
20010 REM
20015 FLAG1=1:GOSUB 11000
20020 K=41:FLAG1=0
20021 IF FLAGBG=1 THEN 20022 ELSE 20040
20022 FOR E1=ASTART TO AEND
20023 AVALUE(E1,0)=0
20024 NEXT E1
20040 FOR E=ASTART TO AEND
20060 GOSUB 4000
20080 NEXT E
```

```
20090 LOCATE 3,22:PRINT RA
20100 COLOR 4:LOCATE 1,42:PRINT TIME$
22000 REM GOSUB 7500 '        DISPLAY TOTAL PRESSURE
22001 REM A$=INKEY$
22002 REM IF LEN(A$)=0 THEN 20100
22003 REM IF ASC(A$)<>13 THEN 20100
22010 GOSUB 5000
22020 RETURN
24000 REM **** SUBROUTINE TO CALIBRATE  ***************************
24001 CLS:COLOR 6,0,0,16:LOCATE 10,38
24001 CLS:COLOR 6,0,0,16:LOCATE 10,38
1LIST   2RUN    3LOAD"  4SAVE"  5FILES  6CONT   7,"LPT1 8LOCATE 9COLOR  10PALET

24000 REM **** SUBROUTINE TO CALIBRATE  ***************************
24001 CLS:COLOR 6,0,0,16:LOCATE 10,38
24002 PRINT "Calibrating   One Moment Please"
24010 R=10
24040 E=28
24045 GOSUB 6000
24050 OUT RANGE,RANGED(R)
24055 OUT FUNC,CONSOLE+FIL+FAR:FOR A=1 TO 3000:NEXT A
24060 GOSUB 2000
24061 IF VALUE<.8 THEN R=R+1:IF R=12 AND VALUE<.8 THEN 20470:IF R=13 THEN R=12:G
OTO 24050
24062 IF VALUE>9.5 THEN R=R-1:IF R=5 THEN R=6:GOTO 24050
24063 IF VALUE=0 THEN R=R-1:GOTO 24050
24070 VALY=R
24080 FARVAL=VALUE:LOCATE 11,40,0:PRINT"FARVAL="FARVAL"X10-"R
24085 R=7
24090 OUT RANGE,RANGED(R)
24100 OUT FUNC,CONSOLE+FIL+MULT:FOR A=1 TO 2000:NEXT A
24120 GOSUB 2000
24121 IF VALUE<.8 THEN IF R=12 THEN 24130 ELSE R=R+1:GOTO 24090
24122 IF VALUE>9.5 THEN R=R-1:GOTO 24090
24123 IF VALUE=0 THEN R=R-1:GOTO 24090
24130 VALX=R
24140 MU
1LIST   2RUN    3LOAD"  4SAVE"  5FILES  6CONT   7,"LPT1 8LOCATE 9COLOR  10PALET

24130 VALX=R
24140 MULTVAL=VALUE:LOCATE 12,40,0:PRINT"MULTVAL="MULTVAL"X10-"R
24160 LOCATE 13,40,0
24180 GAIN=(MULTVAL*(10^(-VALX)))/(FARVAL*(10^(-VALY))):PRINT"GAIN="GAIN
24200 REM FOR A=1 TO 300
24220 LOCATE 14,38
24230 PRINT"Reading Background      One Moment Please"
24240 CHECK=1
24250 ASTART=25
24260 AEND=90
24265 FOR E=ASTART TO AEND
24270 GOSUB 6000
24280 GOSUB 2000
24290 NEXT E
24300 AME$="BKGRND"
24303 OPEN "R",#1,"LOOKUP.TAB",40
24304 FIELD #1,8 AS OK$,4 AS TP$,4 AS SS$,4 AS SE$,10 AS DE$,8 AS TE$
24305 LSET OK$=AME$
24306 LSET DE$=DATE$
24307 LSET TE$=TIME$
24308 LSET TP$=MKS$(R)
24309 LSET SS$=MKS$(ASTART)
24310 LSET SE$=MKS$(AEND)
24311 PUT
1LIST   2RUN    3LOAD"  4SAVE"  5FILES  6CONT   7,"LPT1 8LOCATE 9COLOR  10PALET

24310 LSET SE$=MKS$(AEND)
24311 PUT #1,2
24312 CLOSE #1
24320 GOSUB 8600
24370 RETURN
24380 OPEN "R",#2,"BKGRND",14 'SUBROUTINE TO READ BG FROM DISK**********
24390 FIELD #2,14 AS AMUN$
```

```
24400 CLOSE #1
24410 FOR CL=ASTART TO AEND
24420 GET #2,CL
24430 AVALUE(CL,2)=CVS(AMUN$)
24440 NEXT CL
24450 CLOSE #2
24460 RETURN
26000 REM  *******SUBROUTINE TO DISPLAY STORED BACKGROUND ********
26010 ASTART=25:FLAGBG=1
26020 AEND=90
26030 GOSUB 24380
26040 GOSUB 20000
26045 FLAGBG=0
26050 RETURN
40000 CLS
40001 LOCATE 24,40:PRINT"INPUT '0' ZERO TO EXIT";
40002 LOCATE 12,40:INPUT;"AMU VALU
1LIST   2RUN   3LOAD"   4SAVE"   5FILES   6CONT   7,"LPT1 8LOCATE 9COLOR   10PALET

24440 NEXT CL
24450 CLOSE #2
24460 RETURN
26000 REM  *******SUBROUTINE TO DISPLAY STORED BACKGROUND ********
26010 ASTART=25:FLAGBG=1
26020 AEND=90
26030 GOSUB 24380
26040 GOSUB 20000
26045 FLAGBG=0
26050 RETURN
40000 CLS
40001 LOCATE 24,40:PRINT"INPUT '0' ZERO TO EXIT";
40002 LOCATE 12,40:INPUT;"AMU VALUE";E
40005 IF E=0 THEN 40030
40010 GOSUB 6000
40020 GOTO 40001
40030 GOSUB 6000
40040 RETURN
40100 REM ********* ROUTINE TO PLACE INSTRUMENT IN REQUIRED MODE ***********
40110 CLS
40120 LOCATE 2,14:PRINT "STANDBY--FILAMENT ON, MULTIPLIER ON"'52
40130 LOCATE 3,14:PRINT "OFF------FILAMENT OFF, MULTIPLIER OFF"'52
Ok
00000000
1LIST   2RUN   3LOAD"   4SAVE"   5FILES   6CONT   7,"LPT1 8LOCATE 9COLOR   10PALET
```

What is claimed is:

1. A system for the analytical determination of organic substances in low concentrations by transferring the substances from a source at a relatively high pressure into a mass analyzer at a low pressure, said system comprising:

(a) a metering device by which the source is selectively connectable to the mass analyzer for transferring the substances, (b) a quadrupole mass spectrometer in said mass analyzer, said quadrupole mass spectrometer having a high sensitivity electron multiplier, (c) a vacuum pump for creating a source of vacuum to said quadrupole mass spectrometer, and (d) a mass correction lens disposed between said quadrupole mass spectrometer and said vacuum pump for regulating by the area of its aperture the flow of said substances from said quadrupole mass spectrometer toward said vacuum pump, whereby said substances are detectable with increased sensitivity by said quadrupole mass spectrometer.

2. The system as claimed in claim 1, further comprising an ion pump for obtaining said low pressure at said mass analyzer, and wherein said ion pump is connected at a right angle to the connection between said quadrupole mass spectrometer and said vacuum pump.

3. The system as claimed in claim 1, wherein said vacuum pump is a turbomolecular pump.

4. The system as claimed in claim 1, wherein said high sensitivity electron multiplier is a Channeltron® electron multiplier.

5. The system as claimed in claim 1, wherein said quadrupole mass spectrometer also includes an ionizer for generating ions from said substances and a mass filter disposed about an axis between said ionizer and said electron multiplier for selecting a particular ion mass for transmission from said ionizer to said electron multiplier, and wherein said metering device admits said substances to said mass filter in a direction substantially perpendicular to said axis, and said vacuum pump is connected to said ionizer generally along said axis and draws said substances along said axis from said mass filter toward said ionizer.

6. The system as claimed in claim 1, wherein the mass correction lens has an aperture area which is selected to optimize the detection of a particular molecular mass in said substances to be detected.

7. The system as claimed in claim 6, wherein the mass correction lens has an aperture having an area of about 50% of the area of the passage between the mass spectrometer and the vacuum pump.

8. The system as claimed in claim 7, wherein the passage between the mass spectrometer and the vacuum pump is provided by a pipe having an internal diameter of about 48 mm.

9. A system for the analytical determination of organic substances in low concentrations by transferring the substances from a source at relatively high pressure into the mass analyzer at a low pressure, said system comprising:

(a) a metering device by which the source is selectively connectable to the mass analyzer for transferring the substances, (b) a quadrupole mass spectrometer having a high sensitivity electron multiplier in said mass analyzer, (c) a vacuum pump for creating a source of vacuum to said quadrupole mass spectrometer, and (d) a mass correction lens disposed between said quadrupole mass spectrometer and said vacuum pump for regulating the flow if said substances from said quadrupole mass spectrometer toward said vacuum pump; and (e) means for adjsting an aperture in said mass correction lens such that substances are detactable with increased sensitivity by said quadrupole mass spectrometer.

10. The system as claimed in claim 9, further comprising a data processing unit and an automatic adjusting device for adjusting the area of said aperture in response to data transmitted by said data processing unit to said automatic adjusting device.

11. The system as claimed in claim 10, wherein said data processing device includes means for commanding said quadrupole mass spectrometer to analyze the concentrations of a number of different substances in said sample, and wherein said data processing device is programmed to command said quadrupole mass spectrometer to analyze the concentrations of said substances and is also programmed to adjust the area of said aperture to a different optimum area for the detection of each of said substances.

12. The system as claimed in claim 11, wherein the optimum area for each substance is prestored in memory in said data processor.

13. The system as claimed in claim 11, further comprising an automatic device for adjusting an operating value of said electron multiplier in response to data transmitted by said data processing unit, and wherein said data processing unit is programmed to adjust said operating value of said electron multiplier to respective different values for different ions from said substances.

14. The system as claimed in claim 13, wherein said operating value is the gain of said multiplier and said automatic device adjusts the value of high voltage applied to said electron multiplier to cause electron multiplication.

15. The system as claimed in claim 14, wherein said operating value is predetermined for the mass of each of said ions to optimize the signal-to-noise ratio of detection of the ions, and the predetermined operating values are stored in a memory of said data processing unit and later recalled for automatic adjustment during mass analysis.

16. A method of using a quadrupole mass spectrometer for the analytic determination of organic substances in low concentration by the steps of (1) admitting a flow of said substances through a metering device to said mass spectrometer, (2) concurrently evacuating said spectrometer by a source of high vacuum, (3) placing a mass correction lens having an aperture in the flow of substances between the mass spectrometer and the source of vacuum, and (4) preselecting the area of said aperture to optimize the detection limit of a particular substance to be detected.

17. The method as claimed in claim 16, wherein said source of vacuum is a turbomolecular pump, and an ion pump is also used prior to analysis to obtain a high vacuum in said mass spectrometer.

18. The method as claimed in claim 16, wherein the mass spectrometer has an ion source, an electron multiplier, and a mass filter placed along an axis between said ion source and said electron multiplier, and wherein said sample is admitted to the mass filter and removed along said axis from said ionizer by said source of vacuum.

19. The method as claimed in claim 16, wherein the area of said aperture in said mass correction lens is variably adjustable, and wherein said method further comprises setting said area to a predetermined optimum for the substance to be detected prior to mass analysis for that substance.

20. The method as claimed in claim 19, further comprising the steps of adjusting an operating value for said electron multiplier to different preselected values for the analysis of different fragment ions for said substance to be detected in order to optimize the signal-to-noise ratio of detection for different ion masses.

* * * * *